United States Patent
Liu et al.

(10) Patent No.: US 9,143,889 B2
(45) Date of Patent: Sep. 22, 2015

(54) METHOD OF ESTABLISHING APPLICATION-RELATED COMMUNICATION BETWEEN MOBILE ELECTRONIC DEVICES, MOBILE ELECTRONIC DEVICE, NON-TRANSITORY MACHINE READABLE MEDIA THEREOF, AND MEDIA SHARING METHOD

(75) Inventors: Te-Chuan Liu, Taoyuan County (TW); Cheng-Shiun Jan, Taoyuan County (TW); Jen-Chiun Lin, Taoyuan County (TW); Li-Hui Chen, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 329 days.

(21) Appl. No.: 13/541,770

(22) Filed: Jul. 5, 2012

(65) Prior Publication Data
US 2013/0011025 A1 Jan. 10, 2013

Related U.S. Application Data

(63) Continuation-in-part of application No. 13/461,790, filed on May 2, 2002, and a continuation-in-part of application No. 13/461,776, filed on May 1, 2012, now abandoned, and a continuation-in-part of application
(Continued)

(51) Int. Cl.
*H04L 29/06* (2006.01)
*G06F 21/00* (2013.01)
(Continued)

(52) U.S. Cl.
CPC .............. *H04W 4/008* (2013.01); *H04W 4/206* (2013.01); *H04W 12/04* (2013.01); *H04W 12/06* (2013.01); *H04W 4/023* (2013.01)

(58) Field of Classification Search
CPC ..... H04W 12/06; H04W 12/04; H04W 4/206; H04W 4/008; H04W 4/023
See application file for complete search history.

(56) References Cited

U.S. PATENT DOCUMENTS

| 5,799,315 A | 8/1998 | Rainey |
| 6,101,484 A | 8/2000 | Halbert |

(Continued)

FOREIGN PATENT DOCUMENTS

| CN | 1484800 A | 3/2004 |
| CN | 101782904 A | 7/2010 |

(Continued)

OTHER PUBLICATIONS

McDuff, D. ; El Kaliouby, R. ; Kassam, K. ; Picard, R.; "Acume: A new visualization tool for understanding facial expression and gesture data"; Automatic Face & Gesture Recognition and Workshops (FG 2011), 2011 IEEE International Conference on DOI: 10.1109/FG.2011.5771464; Publication Year: May 2011; pp. 591-596.*

(Continued)

*Primary Examiner* — Andrew Nalven
*Assistant Examiner* — Courtney Fields
(74) *Attorney, Agent, or Firm* — Winston Hsu; Scott Margo

(57) ABSTRACT

When a host mobile electronic device and a client mobile electronic device connect to each other for at least a second time, the client mobile electronic device refers to an entry corresponding to the host mobile electronic device for retrieve required information to wirelessly connect to the host mobile electronic device and to connect to an application installed on the host mobile electronic device under authentication. Therefore, the client mobile electronic device can be relieved from the burden of requesting required information for authentication repeatedly.

1 Claim, 26 Drawing Sheets

Related U.S. Application Data

No. 13/517,563, filed on Jun. 13, 2012, and a continuation-in-part of application No. 13/517,540, filed on Jun. 13, 2012.

(60) Provisional application No. 61/504,317, filed on Jul. 5, 2011.

(51) Int. Cl.
| | |
|---|---|
| H04W 4/00 | (2009.01) |
| H04W 12/04 | (2009.01) |
| H04W 12/06 | (2009.01) |
| H04W 4/20 | (2009.01) |
| H04W 4/02 | (2009.01) |

(56) References Cited

U.S. PATENT DOCUMENTS

| | | | |
|---|---|---|---|
| 6,402,691 | B1 | 6/2002 | Peddicord |
| 6,604,089 | B1 | 8/2003 | Van Horn |
| 6,631,356 | B1 | 10/2003 | Van Horn |
| 6,934,690 | B1 | 8/2005 | Van Horn |
| 7,088,238 | B2 | 8/2006 | Karaoguz |
| 7,146,330 | B1 | 12/2006 | Alon |
| 7,236,472 | B2 | 6/2007 | Lazaridis |
| 7,263,498 | B1 | 8/2007 | Van Horn |
| 7,483,958 | B1 | 1/2009 | Elabbady |
| 7,599,703 | B2 | 10/2009 | Derks |
| 8,611,928 | B1 | 12/2013 | Bill |
| 2002/0066100 | A1 | 5/2002 | Hoang |
| 2002/0099772 | A1* | 7/2002 | Deshpande et al. .......... 709/204 |
| 2004/0008873 | A1 | 1/2004 | Sogo |
| 2005/0059418 | A1 | 3/2005 | Northcutt |
| 2005/0079858 | A1 | 4/2005 | Rosen |
| 2005/0266798 | A1 | 12/2005 | Moloney |
| 2005/0273493 | A1 | 12/2005 | Buford |
| 2006/0008256 | A1 | 1/2006 | Khedouri |
| 2006/0143236 | A1 | 6/2006 | Wu |
| 2006/0179078 | A1 | 8/2006 | McLean |
| 2006/0198448 | A1 | 9/2006 | Aissi |
| 2006/0217967 | A1 | 9/2006 | Goertzen |
| 2006/0242106 | A1 | 10/2006 | Bank |
| 2007/0141984 | A1 | 6/2007 | Kuehnel |
| 2007/0141988 | A1 | 6/2007 | Kuehnel |
| 2007/0161402 | A1 | 7/2007 | Ng. |
| 2008/0066164 | A1 | 3/2008 | Chebolu |
| 2008/0091717 | A1 | 4/2008 | Garbow |
| 2008/0153466 | A1 | 6/2008 | Morel |
| 2008/0222295 | A1 | 9/2008 | Robinson |
| 2008/0256129 | A1 | 10/2008 | Salinas |
| 2009/0060288 | A1 | 3/2009 | Myers |
| 2009/0077220 | A1 | 3/2009 | Svendsen |
| 2009/0083105 | A1 | 3/2009 | Bhogal |
| 2009/0104875 | A1 | 4/2009 | Naniyat |
| 2009/0111378 | A1* | 4/2009 | Sheynman et al. .......... 455/41.1 |
| 2009/0150321 | A1 | 6/2009 | Ning |
| 2009/0171487 | A1 | 7/2009 | Wilhelm |
| 2009/0222392 | A1 | 9/2009 | Martin |
| 2009/0259524 | A1 | 10/2009 | Rozenkrants |
| 2009/0265426 | A1 | 10/2009 | Svendsen |
| 2010/0054218 | A1 | 3/2010 | Clayton |
| 2010/0293029 | A1 | 11/2010 | Olliphant |
| 2010/0325238 | A1 | 12/2010 | Khedouri |
| 2011/0066743 | A1 | 3/2011 | Hurley |
| 2011/0081952 | A1 | 4/2011 | Song |
| 2011/0320402 | A1 | 12/2011 | Agampodi |
| 2012/0019379 | A1* | 1/2012 | Ben Ayed ................ 340/539.1 |
| 2012/0036104 | A1 | 2/2012 | Manley |
| 2012/0124162 | A1 | 5/2012 | Cassidy |
| 2012/0150619 | A1 | 6/2012 | Sushil |
| 2012/0179516 | A1 | 7/2012 | Fakhrai |
| 2012/0220222 | A1 | 8/2012 | Hill |
| 2012/0278387 | A1 | 11/2012 | Garcia |
| 2013/0012123 | A1 | 1/2013 | DeLuca |
| 2013/0132220 | A1 | 5/2013 | Baum |
| 2014/0172881 | A1* | 6/2014 | Petrou et al. ................ 707/748 |

FOREIGN PATENT DOCUMENTS

| | | |
|---|---|---|
| CN | 102035935 A | 4/2011 |
| EP | 1 478 099 A1 | 11/2004 |
| EP | 1881678 A1 * | 1/2008 |
| EP | 2 108 972 A2 | 10/2009 |
| JP | 2008252606 A | 10/2008 |
| TW | 200622893 | 7/2006 |
| WO | 0186486 A2 | 11/2001 |
| WO | 0219181 A2 | 3/2002 |

OTHER PUBLICATIONS

Office action mailed on Nov. 12, 2013 for the U.S. Appl. No. 13/461,790, filed May 2, 2012, p. 1-37.
Office action mailed on May 15, 2014 for the U.S. Appl. No. 13/461,790, filed May 2, 2012, p. 1-31.
Partial search report issued on Jul. 22, 2013 for EP application No. 12004980.4, filing date Jul. 5, 2012, pp. 1-6.
Search report issued on Dec. 2, 2013 for EP application No. 12004980.4, filing date Jul. 5, 2012, pp. 1-6.
Office action mailed on Jan. 31, 2014 for the U.S. Appl. No. 13/539,494, filed Jul. 2, 2012, p. 1-17.
Office action mailed on Nov. 5, 2014 for the U.S. Appl. No. 13/517,563, filed Jun. 13, 2012, p. 1-35.
Office action mailed on Jul. 22, 2014 for the U.S. Appl. No. 13/517,563, filed Jun. 13, 2012, p. 1-36.
Office action mailed on Sep. 2, 2014 for the U.S. Appl. No. 13/461,776, filed May 1, 2012, p. 1-38.
Office action mailed on Sep. 10, 2014 for the U.S. Appl. No. 13/461,790, filed May 2, 2012, p. 1-46.
Office action mailed on Oct. 22, 2014 for the Taiwan application No. 101123709, filing date: Jul. 2, 2012, p. 1-10.
Office action mailed on Oct. 2, 2014 for the U.S. Appl. No. 13/539,494, filed Jul. 2, 2012, p. 1-21.
Office action mailed on May 9, 2014 for the Taiwan application No. 101124229, filing date: Jul. 5, 2012, p. 1-4.
Office action mailed on Feb. 20, 2015 for the U.S. Appl. No. 13/517,540, filed Jun. 13, 2012, p. 1-45.
Office action mailed on Jan. 30, 2015 for the China application No. 201210228383.9, filing date Jul. 2, 2012, pp. 1-8.
Search report issued on Feb. 4, 2015 for EP application No. 14190084.5, filing date Jul. 5, 2012, pp. 1-3.
Office action mailed on Feb. 13, 2015 for the Taiwan application No. 101124229, filing date Jul. 5, 2012, p. 1-4.
Office action mailed on Feb. 20, 2015 for the U.S. Appl. No. 13/517,563, filed Jun. 13, 2012, p. 1-28.
Office action mailed on Apr. 8, 2015 for the U.S. Appl. No. 13/539,494, filed Jul. 2, 2012, p. 1-25.
Office action mailed on Jun. 3, 2015 for the China application No. 201210233077.4, filed Jul. 5, 2012, p. 1-2. Translation.

* cited by examiner

METHOD OF ESTABLISHING APPLICATION-RELATED COMMUNICATION BETWEEN MOBILE ELECTRONIC DEVICES, MOBILE ELECTRONIC DEVICE, NON-TRANSITORY MACHINE READABLE MEDIA THEREOF, AND MEDIA SHARING METHOD

CROSS REFERENCE TO RELATED APPLICATIONS

This continuation-in-part application claims priority of U.S. patent application Ser. No. 13/461,790 filed on May 2, 2012, U.S. patent application Ser. No. 13/461,776 filed on May 1, 2012, U.S. patent application Ser. No. 13/517,563 filed on Jun. 13, 2012, and U.S. patent application Ser. No. 13/517,540 filed on Jun. 13, 2012, all of which claim priority of U.S. Provisional Application No. 61/504,317 filed on Jul. 5, 2011.

BACKGROUND OF THE INVENTION

1. Field of the Invention

The present invention relates to a method of establishing application-related communication between mobile electronic devices, the mobile electronic device thereof, and a media sharing method and more particularly, a method of establishing application-related communication between mobile electronic devices according to whether the mobile electronic devices are connected to each other for a first time or later than the first time, the mobile electronic device thereof, and a media sharing method.

2. Description of the Prior Art

There are some issues related to people's daily life. The issues include:

(A) Group Buying

Most market stores are willing to offer a lower price, i.e. offering a discount, for a specific type of merchandise when customers attempt to buy a larger quantity of this specific type of merchandise. Customers also learn to group together for buying this specific type merchandise they want with a discount.

However, grouping enough customers is no easy task, especially when one customer encounters a specific type of merchandise he/she wants by accident but is bothered by the high price of the specific type of merchandise. If it happens that there are enough nearby customer wanting the same type of merchandise, grouping together with the enough number of nearby customers could be a better way for this customer to buy the specific type of merchandise with a discount.

(B) Reminding

A popular way to remind people of tasks on his/her to-do-list is to set his/her schedule on mobile electronic devices, such as smart mobile phones or tablet computers. However, when a user of a mobile electronic device meets someone who has important businesses related to the user, it is always not easy to remind the user of the important business when they meet so that many missed opportunities for the user occur.

(C) Contact List

A mobile electronic device user, such as a mobile phone user or a tablet computer user, may have multiple groups of contacts in a database of his/her mobile electronic device. Contact groups can be classified into subjects including families, friends, work team members, professional acquaintances, emergency contacts, and etc. One group member of the contact group may maintain a group contact list for the entire contact group and update it periodically. When updates occur, the rest of the members of the contact group have to correspondingly update the group contact list manually, or correctness of the group contact list may fail.

Besides, when a group member intends to update the group contact list, it usually requires complicated manual operations at bad timings, e.g., when the group member is busy, for inputting updated information.

(D) Media Manipulations

In general, conventional portable digital media players ("DMPs"), which are also mobile electronic devices, are capable of allowing their users to (a) transfer compressed media files from a computer to the mobile electronic device by using an associated transfer management program installed on the computer and utilized for establishing a physical connection to the computer, where the physical connection could be a USB cable; (b) store the compressed media files in a non-volatile memory; (c) decode the compressed media files for playback according to various compression algorithms; (d) convert a compressed or uncompressed digital file to an analog stream, and potentially process signals of the analog stream to enhance audio and video of the analog file; (e) process and amplify the signals of the analog stream; and (f) produce high-fidelity audio and video, which may be played, paused, fast-forwarded, rewound, skipped or replayed instantly and on-demand.

Also, typically in the case of audio DMPs (e.g., the "iPod Nano"), the mobile electronic device may include a relatively small digital display window that provides information regarding the audio files stored on the mobile electronic device, where the information may include a song title or an artist name. The mobile electronic device may also be utilized for viewing (or modifying) a sequence of audio files currently stored on the mobile electronic device.

However, data transfer and advanced sorting/sequencing of audio/video selections are difficult or impossible for a user to accomplish unless the DMP is connected to the computer, which does not allow the user to insert new content or make other desirable modifications to original contents stored on the DMP, such as modifying the sequence of the audio/video selections stored on the device while the player device is not physically connected to the computer. Moreover, non-technical users of the audio/video players are usually restricted from creating, editing and managing custom "playlists" (i.e., fixed song sequences), where a user is usually allowed by the mobile electronic device to develop and use a variety of customized playlists.

Also disadvantageously, the display and user interface on the mobile electronic device are typically limited in size, including the use of multi-functional buttons which are complex for many users and/or are not touch-sensitive, thereby discouraging non-expert users from viewing, modifying, and even sharing the playlists and the sequence of audio files stored on the DMP.

SUMMARY OF THE INVENTION

The claimed invention discloses a method of establishing application-related communication between mobile electronic devices. The method comprises a client mobile electronic device scanning for mobile electronic devices in its proximity and wirelessly receiving from a host mobile electronic device a phrase packet encapsulating an identity of the host mobile electronic device, a type of an application installed on the host mobile electronic device, and information about the application; the client mobile electronic device decoding the phrase packet to retrieve the identity of the host mobile electronic device, the type of the application, and the information about the application; the client mobile electronic device wirelessly connecting with the host mobile electronic device using the identity of the host mobile electronic device and a key generated from the phrase packet for authentication; and the client mobile electronic device wirelessly establishing an application-related communication with the application installed on the host mobile electronic device using a credential recorded in an entry for authentication. The entry was generated, certified, and stored in the client mobile electronic device when the client mobile electronic device previously wirelessly connected with the host mobile electronic device.

The method of establishing application-related communication between mobile electronic devices. The method comprises: (a) a client mobile electronic device scanning for mobile electronic devices in its proximity and wirelessly receiving from a host mobile electronic device a phrase packet encapsulating an identity of the host mobile electronic device, a type of an application installed on the host mobile electronic device, and information about the application; (b) the client mobile electronic device decoding the phrase packet to retrieve the identity of the host mobile electronic device, the type of the application, and the information about the application; (c) the client mobile electronic device creating an entry for host mobile electronic device, prompting its user to certify the entry, and generating an alias of the host mobile electronic device according to the phrase packet when no entry corresponding to the host mobile electronic device is found in the client mobile electronic device; (d) the client mobile electronic device wirelessly connecting with the host mobile electronic device using the identity of the host mobile electronic device and a key generated from the phrase packet for authentication; (e) the client mobile electronic device wirelessly requesting the host mobile electronic device for a credential using an identity of the client mobile electronic device and the alias; and (f) the client mobile electronic device wirelessly establishing an application-related communication with the application installed on the host mobile electronic device using the credential for authentication after the host mobile electronic device wirelessly returns the credential in response to the step (e).

The claimed invention discloses a method of establishing application-related communication between mobile electronic devices. The method comprises: (a) a client mobile electronic device scanning for mobile electronic devices in its proximity and wirelessly receiving from a host mobile electronic device a phrase packet encapsulating an identity of the host mobile electronic device, an application installed on the host mobile electronic device, and information about the application; (b) the client mobile electronic device decoding the phrase packet to retrieve the identity of the host mobile electronic device; (c) the client mobile electronic device searching a plurality of entries previously stored in the mobile electronic device for a first entry matching the identity of the host mobile electronic device; (d) the client mobile electronic device creating a second entry in the client mobile electronic device according to the phrase packet and prompting its user to certify the second entry or fetching information from the first entry depending on a result of the step (c); (e) the client mobile electronic device wirelessly connecting with the host mobile electronic device using the identity of the host mobile electronic device and a key generated from the phrase packet for authentication; and (f) the client mobile electronic device establishing an application-related communication with the application using a first credential recorded in the first entry for authentication or using a second credential corresponding to an alias of the host mobile electronic device generated according to the phrase packet for authentication, depending on the result of the step (c).

The claimed invention discloses a mobile electronic device. The mobile electronic device comprises a controller and a memory. The controller is configured to scan mobile electronic devices in its proximity, wirelessly receive from an external mobile electronic device a phrase packet encapsulating an identity of the external mobile electronic device, a type of an application installed on the external mobile electronic device, and information about the application, configured to decode the phrase packet to retrieve the identity of the external mobile electronic device, the type of an application, and the information about the application, configured to search a plurality of entries in the mobile electronic device for a first entry matching the identity of the external mobile electronic device, configured to create a second entry in the client mobile electronic device according to the phrase packet and prompt a user of the mobile electronic device to certify the second entry or fetch information from the first entry depending on whether the first entry is found in the mobile electronic device, configured to wirelessly connect with the external mobile electronic device using the identity of the external mobile electronic device and a key generated from the phrase packet for authentication, and configured to establish an application-related communication with the application using a first credential recorded in the first entry for authentication or using a second credential corresponding to an alias of the external mobile electronic device generated according to the phrase packet for authentication depending on whether the first entry is found in the mobile electronic device. The memory is configured to store the plurality of entries.

The claimed invention discloses a non-transitory machine readable media. The non-transitory machine readable media comprises computer code which when executed by a mobile electronic device wirelessly receives from a host mobile electronic device a phrase packet encapsulating an identity of the host mobile electronic device and information about an application installed on the host mobile electronic device; computer code which when executed by the mobile electronic device decodes the phrase packet to retrieve the identity of the host mobile electronic device; computer code which when executed by the mobile electronic device searches a plurality of entries stored in the mobile electronic device for a first entry matching the identity of the host mobile electronic device; computer code which when executed by the mobile electronic device creates a second entry in the client mobile electronic device according to the phrase packet or fetches information from the first entry depending on whether the first entry is found in the mobile electronic device; computer code which when executed by the mobile electronic device wirelessly connects with the host mobile electronic device using the identity of the host mobile electronic device and a key generated from the phrase packet for authentication; and computer code which when executed by the mobile electronic device establishes an application-related communication with the application using a first credential recorded in the first entry for authentication or using a second credential corresponding to an alias of the host mobile electronic device generated according to the phrase packet for authentication depending on whether the first entry is found in the mobile electronic device.

The claimed invention discloses a media sharing method utilizing a wireless communication protocol. The media sharing method comprises a first mobile electronic device scanning a photo filmed by itself or a video taped by itself, and detecting whether there is at least one facial pattern on the photo or the video; the first mobile electronic device broadcasting a polling signal based on a wireless communication protocol; the first mobile electronic device confirming whether there is a second mobile electronic device utilizing the wireless communication protocol, wherein the confirmation is performed by receiving a response signal sent by the second mobile electronic device in response to the polling signal; comparing at least one facial pattern characteristic on the photo or the video with at least one facial pattern characteristic stored on the second mobile electronic device or with at least one facial pattern characteristic related to a user of the second mobile electronic device stored in the first mobile electronic device when the first mobile electronic device receives the response signal and when there is at least one facial pattern detected on the photo or the video; and the first mobile electronic device sending the photo or the video to the second mobile electronic device when a result of comparing the at least one facial pattern characteristic on the photo or the video with the at least one facial pattern characteristic stored on the second mobile electronic device or with the at least one facial pattern characteristic related to the user of the second mobile electronic device stored in the first mobile electronic device is positive about matching.

These and other objectives of the present invention will no doubt become obvious to those of ordinary skill in the art after reading the following detailed description of the preferred embodiment that is illustrated in the various figures and drawings.

DETAILED DESCRIPTION

Wireless services are nowadays popularly provided by mobile electronic devices. Some convenient wireless service providing methods are disclosed in the present application to introduce conveniences for users of the mobile electronic devices. According to one embodiment of the present invention, functions of the wireless service may include photo/video sharing, note reminding, grouping for group purchasing, virtual playlist sharing/media file sharing, contact list information sharing, message sharing, and multi-language communication. Wireless technologies utilized in the present invention may inter alia, Bluetooth, WiFi, WiFi direct, near field communication, or peer-to-peer communication.

Figure 1:
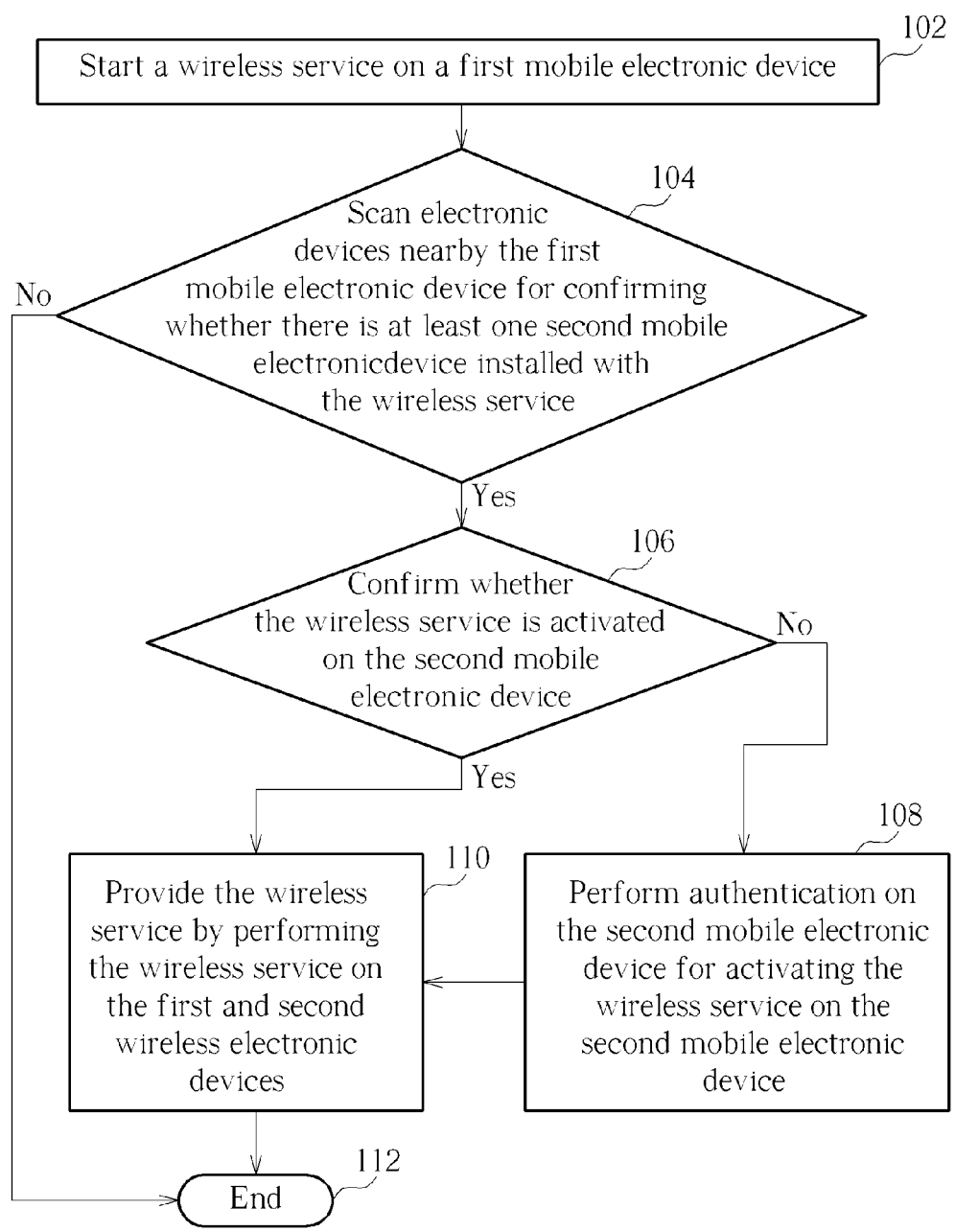
FIG. 1 illustrates a simplified flowchart of the wireless service providing method according to an embodiment of the present invention.

Please refer to FIG. 1, which illustrates a simplified flowchart of the wireless service providing method according to an embodiment of the present invention. As shown in FIG. 1, the wireless service providing method includes the following steps:

Step 102: Start a wireless service on a first mobile electronic device, and go to Step 104.

Step 104: Scan mobile electronic devices near the first mobile electronic device for confirming whether there is at least one second mobile electronic device installed with the wireless service; when there is at least one second electronic device installed with the wireless service, go to Step 106; else, go to Step 112.

Step 106: Confirm whether the wireless service is activated on the second mobile electronic device; when the wireless service is activated on the second mobile electronic device, go to Step 110; else, go to Step 108.

Step 108: Perform authentication on the second mobile electronic device by the first mobile electronic device for activating the wireless service on the second mobile electronic device, and go to Step 110.

Step 110: Provide the wireless service by performing the wireless service on the first and second wireless electronic devices.

Step 112: End.

In Step 104, the scanning procedure is performed by utilizing proximity search in one embodiment of the present invention, i.e., to search other mobile electronic devices near the first mobile electronic device.

In Step 106, if the wireless service is activated on the second mobile electronic device, it indicates the fact that the second mobile electronic device has been authorized to access the first mobile electronic device. Else, in Step 108, if the wireless service is not activated on the second mobile electronic device, the authentication is performed on the second mobile electronic device by the first mobile electronic device for confirming whether the second mobile electronic device can be allowed to access the first mobile electronic device.

Steps shown in FIG. 1 are utilized for describing primary timings for providing the wireless service, where the following wireless services discussed throughout the spec are mostly established using proximity-based communication, and details for different functions will be introduced later. Note that proximity mentioned in the spec may refer to a distance, which is less than 10 meters, between mobile electronic devices, according to one embodiment of the present invention.

Embodiments of the present invention related to the above-mentioned services will be described in the following paragraphs.

In the following descriptions, a local user is assumed to hold a first mobile electronic device, whereas other mobile electronic devices near the first mobile electronic device are assumed to be at least one or multiple second mobile electronic devices.

(1) Group Purchasing Grouping

Most markets are willing to offer a lower price for a specific type of merchandise when customers attempt to buy a larger quantity of this specific type of merchandise. For taking advantage of the lower price, customers also learn to group together for buying this specific type merchandise.

However, grouping enough customers is no easy task, especially when one customer encounters a specific type of merchandise he/she wants by accident, but is bothered by the high price of the specific type of merchandise. If it happens that there is another nearby customer wanting the same type of merchandises, grouping together with the nearby customer could be a best way for this customer to buy the specific type of merchandises at a lower price.

Figure 2:
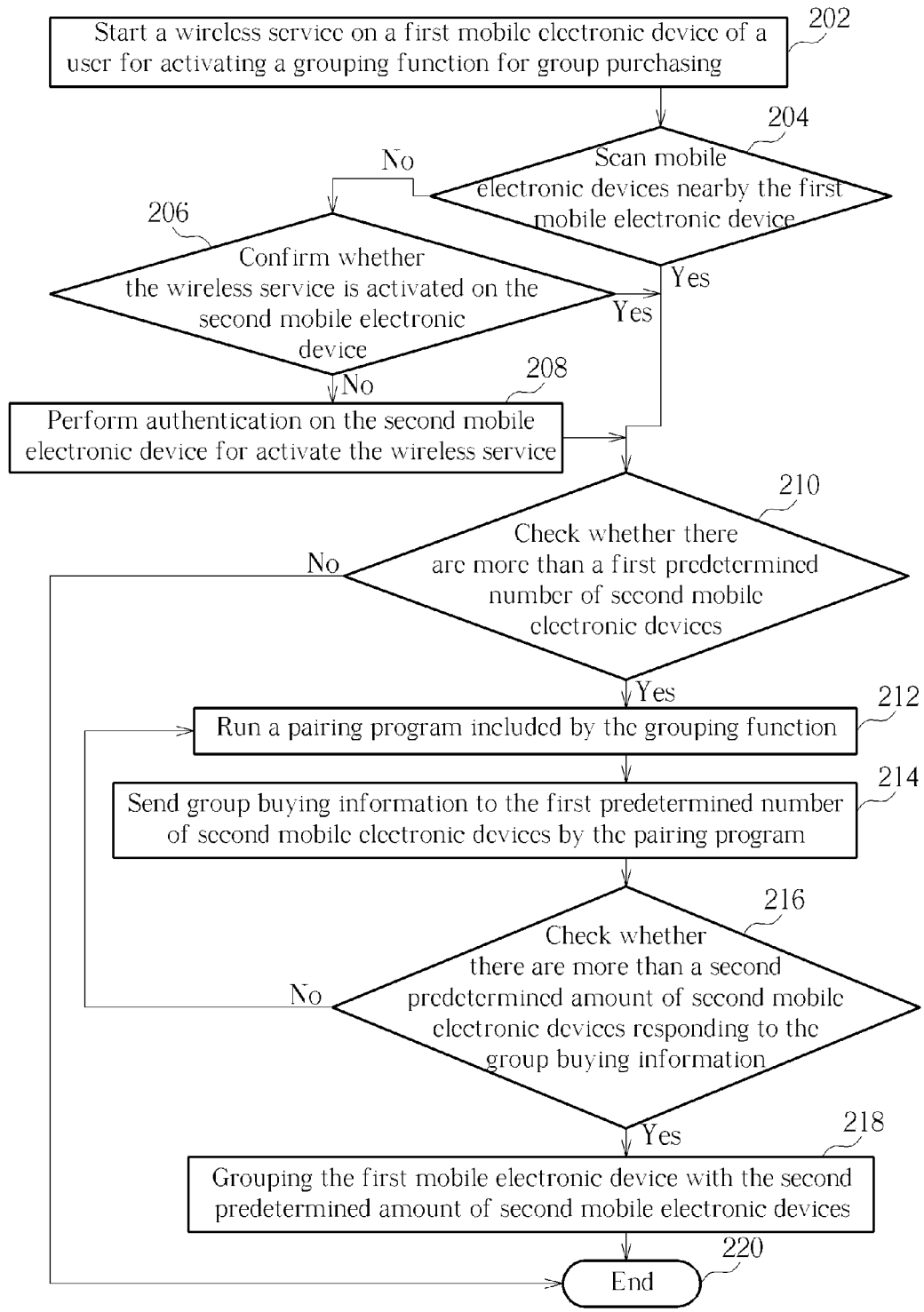
FIG. 2 illustrates a grouping method for group purchasing based on the wireless service providing method shown in FIG. 1.

For introducing conveniences for this kind of customer, the present application discloses a grouping method for group purchasing based on the wireless service providing method shown in FIG. 1, as shown in FIG. 2. The grouping method includes steps as follows:

Step 202: Start a wireless service on a first mobile electronic device of a user for activating a grouping function for group purchasing. Go to Step 204.

Step 204: Scan mobile electronic devices near the first mobile electronic device; when there is at least one second mobile electronic device installed with the wireless service, go to Step 206; else, go to Step 220.

Step 206: Confirm whether the wireless service is activated on the second mobile electronic device; when the wireless service is activated on the second mobile electronic device, go to Step 210; else, go to Step 208.

Step 208: Perform authentication on the second mobile electronic device for activating the wireless service, and go to Step 210.

Step 210: Check whether there are more than a first predetermined number of second mobile electronic devices; when there are more than the first predetermined number of second mobile electronic devices, go to Step 212; else, go to Step 220.

Step 212: Run a pairing program included by the grouping function.

Step 214: Send group buying information to the first predetermined number of second mobile electronic devices by the pairing program.

Step 216: Check whether there are more than a second predetermined amount of second mobile electronic devices responding to the group buying information; when there are more than the second predetermined number of second mobile electronic devices responding to the group buying information, go to Step 218; else, go to Step 212.

Step 218: Grouping the first mobile electronic device with the second predetermined number of second mobile electronic devices, and go to Step 220.

Step 220: End.

FIG. 2 indicates a specific embodiment of the steps shown in FIG. 1, for example, Step 202 corresponds to Step 102, Step 204 corresponds to Step 104, Step 206 corresponds to Step 106, Step 208 corresponds to Step 108, and Steps 210-218 correspond to Step 110.

For brevity, Steps 202-208 are not further explained. And Steps 212-220 are explained by example taking the first predetermined number to be ten and taking the second predetermined number to be six under a presumption that a lower price of a specific type of merchandises can be allowed if more than six of the specific type of merchandises are intended to be bought.

In Step 210, after a user of a first mobile electronic device intends to buy the specific type of merchandise with the lower price, and when the first mobile electronic device has found more than one nearby mobile electronic device, the first mobile electronic device checks whether the number of the at least one nearby mobile electronic devices is larger than ten, leading to a chance of group-buying the specific merchandise with the lower price.

In Step 212, after the first mobile electronic device has found at least ten nearby mobile electronic devices to make the group-buying, the first mobile electronic device runs a pairing program to perform a group function of the provided wireless service.

In Step 214, the pairing program sends or broadcasts group buying information about the specific type of merchandise to the at least ten nearby mobile electronic devices so that users of the at least ten nearby mobile electronic devices can respond according to the group buying information. The group buying information may further include an authentication code so that users of the at least ten nearby mobile may join the group buying by accepting the authentication.

In Step 216, the pairing program checks responses from the at least ten nearby mobile electronic devices for confirming the attempts of buying the specific type of merchandises with the lower price from the users of the at least ten nearby mobile electronic devices.

If there are more than six from the at least ten mobile electronic devices showing a positive intention to make the group purchase, in Step 218, the pairing program groups the first mobile electronic device with the more than six mobile electronic devices to make the group purchase with the lower price. Else, if there are less than six, in Step 212, the pairing program will keep on waiting or sending the group buying information for responses from the at least ten nearby mobile electronic devices till there are at least six showing the positive intention to make the group buying.

In some embodiments of the present invention, a waiting time for reply and a confidence value may also be utilized by the pairing program as references to maximize the probability of success in making the group purchase, where the confidence value is generated for every nearby mobile electronic device during the grouping procedure.

(2) Photo/Video Sharing

Most conventional photo/video sharing systems are server-based, however, depositing photos or videos on servers may introduce significant inconveniences for users.

For example, before uploading photos or videos, a user has to remember exact local archives where photos or videos are stored. Besides, privacy and security of depositing the photos or videos on the servers are always likely to be breached.

To avoid the above-mentioned problems, the present invention discloses three photo/video sharing methods based on the wireless service providing method shown in FIG. 1.

Figure 3:
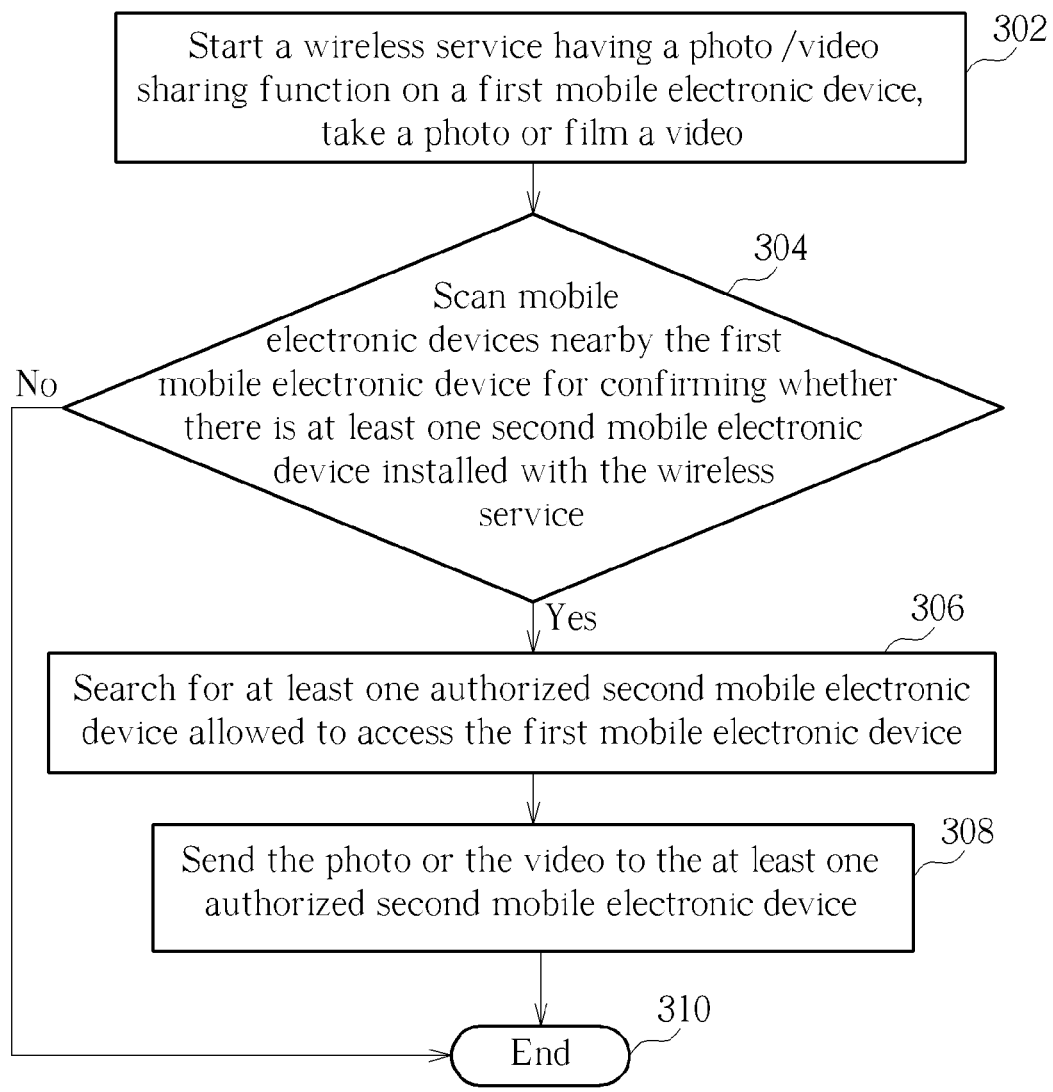
FIGS. 3-5 is a flowchart of the photo/video sharing method according to related embodiments of the present invention and based on the wireless service providing method shown in FIG. 1.

Please refer to FIG. 3, which is a flowchart of the photo/video sharing method according to a first related embodiment of the present invention and based on the wireless service providing method shown in FIG. 1. FIG. 3 illustrates as follows:

Step 302: Start a wireless service having a photo/video sharing function on a first mobile electronic device, take a photo or film a video, and go to Step 304.

Step 304: Scan mobile electronic devices near the first mobile electronic device for confirming whether there is at least one second mobile electronic device installed with the wireless service; when there is at least one second mobile electronic device installed with the wireless service, go to Step 310; else, go to Step 306.

Step 306: Search for at least one authorized second mobile electronic device allowed to access the first mobile electronic device, and go to Step 308.

Step 308: Send the photo or the video to the at least one authorized second mobile electronic device, and go to Step 310.

Step 310: End.

FIG. 3 indicates a specific embodiment of the steps shown in FIG. 1, for example, Step 302 corresponds to Step 102, Step 304 corresponds to Step 104, Step 306 corresponds to Step 108, and Step 308 corresponds to Step 110.

In one embodiment of the present invention, the authentication confirmation in Step 306 may be optional.

In Step 302, the photo can be taken before or after the wireless service is started, and similarly, the video can be filmed before or after the wireless service is started as well.

In Step 304 and Step 306, at least one nearby mobile electronic device installed with the wireless service having the photo/video sharing function and authorized to access the first mobile electronic device is searched for, so as to share the photos or the videos of those authorized nearby mobile electronic devices in Step 308.

Note that in an embodiment of the present invention, between Step 304 and 306, whether the wireless service is activated on the at least one second mobile electronic device can also be confirmed, as mentioned in Step 206.

Figure 4:
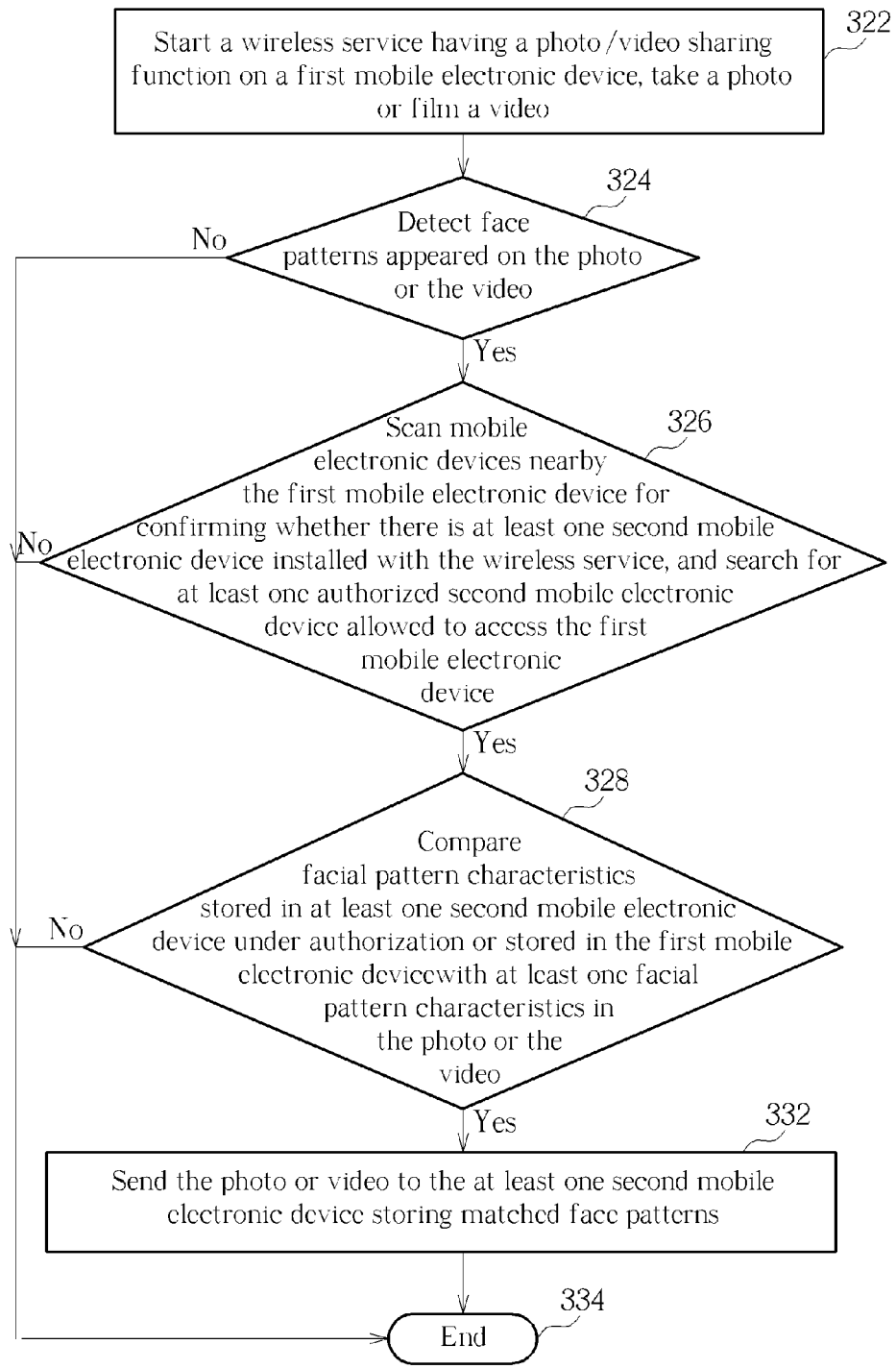

Please refer to FIG. 4, which is a flowchart of the photo/video sharing method according to a second related embodiment of the present invention and based on the wireless service providing method shown in FIG. 1. FIG. 4 illustrates steps as follows:

Step 322: Start a wireless service having a photo/video sharing function on a first mobile electronic device, take a photo or film a video, and go to Step 324.

Step 324: Detect facial pattern characteristics appearing in the photo or the video; when at least one facial pattern characteristic is detected, go to Step 326; else, go to Step 334.

Step 326: Scan mobile electronic devices near the first mobile electronic device for confirming whether there is at least one second mobile electronic device installed with the wireless service, and search for at least one authorized second mobile electronic device allowed to access the first mobile electronic device; when there is at least one second mobile electronic device installed with the wireless device and allowed to access the first mobile electronic device, go to Step 328; else, go to Step 334.

Step 328: Compare facial pattern characteristics stored in at least one second mobile electronic device under authorization or facial pattern characteristics stored in the first mobile electronic device related to users of the at least one second mobile electronic device with at least one facial pattern characteristics in the photo or the video; when at least one facial pattern characteristic in the at least one second mobile electronic device is found to match facial pattern characteristics detected in the photo or the video, go to Step 332; else, go to Step 334.

Step 332: Send the photo or video to the at least one second mobile electronic device storing matched facial pattern characteristics, and go to Step 334.

Step 334: End.

FIG. 4 indicates a specific embodiment of the steps shown in FIG. 1, for example, Step 322 corresponds to Step 102, Step 326 corresponds to Steps 104, 106 and 108, and Steps 328 and 332 correspond to Step 110. The method shown in FIG. 4 utilizes facial detection/recognition technologies for photo/video sharing.

In Step 322, the photo can be taken before or after the wireless service is started, and so can the video.

In Step 324, the facial pattern characteristics on a photo or a video may be detected using facial recognition, which is configured to identify facial pattern characteristics of human according to characteristics on a human's face, such as a nose, a mouth, eyes, and etc. In summary, the facial recognition techniques in Step 324 for detection may be implemented based on statistical or geometrical characteristics on a human's face.

In Step 328, facial patterns of users of at least one nearby mobile electronic device stored in the at least one nearby mobile electronic device or previously stored in the first mobile electronic device are compared with the facial pattern characteristics detected on the photo or video in the first mobile electronic device, where the facial patterns of users of at least one nearby mobile electronic device may be previously stored in the first mobile electronic device at previous times when the first mobile electronic device is wireless connected to the at least one nearby mobile electronic device. If there are matches, the photo or video will be sent to the at least one nearby mobile electronic device having the matching facial pattern characteristics. As a result, photo/video sharing may be performed according to whether facial pattern characteristics related to users of the nearby mobile electronic devices, which may be stored in the nearby mobile electronic devices or the first mobile electronic device, appear in the to-be-shared photo or video.

Figure 5:
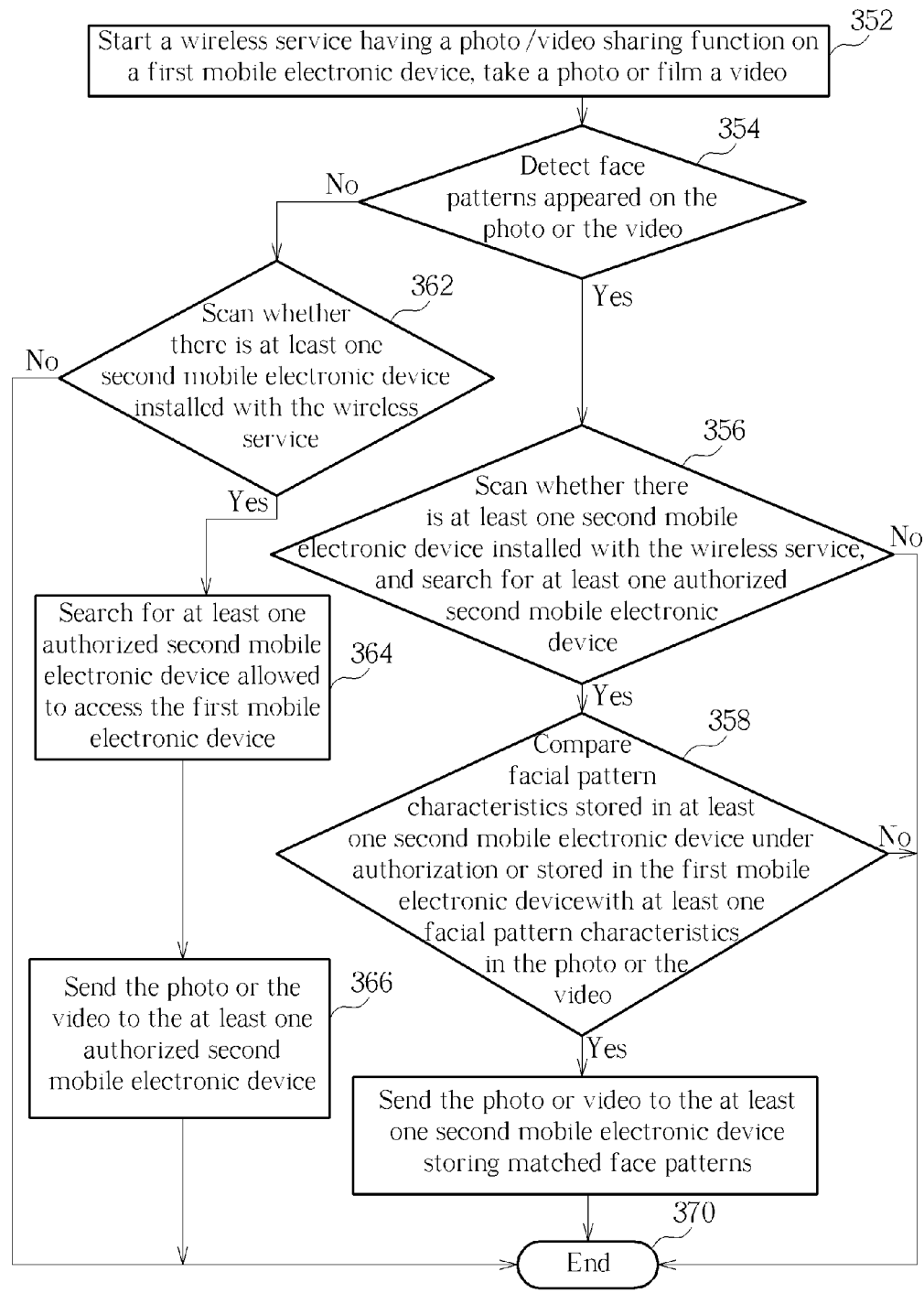

Please refer to FIG. 5, which is a flowchart of the photo/video sharing method according to a third related embodiment of the present invention and based on the wireless service providing method shown in FIG. 1, where the third related embodiment includes a combination of steps shown in FIGS. 3 and 4. FIG. 5 illustrates steps as follows:

Step 352: Start a wireless service having a photo/video sharing function on a first mobile electronic device, take a photo or film a video, and go to Step 354.

Step 354: Detect facial patterns appearing in the photo or the video; when at least one facial pattern is detected, go to Step 356; else, go to Step 362.

Step 356: Scan mobile electronic devices near the first mobile electronic device for confirming whether there is at least one second mobile electronic device installed with the wireless service, and search for at least one authorized second mobile electronic device allowed to access the first mobile electronic device; when there is at least one second mobile electronic device installed with the wireless device and allowed to access the first mobile electronic device, go to Step 358; else, go to Step 370.

Step 358: Compare facial patterns stored in at least one second mobile electronic device under authorization or facial pattern characteristics stored in the first mobile electronic device related to users of the at least one second mobile electronic device with the photo or the video; when at least one facial pattern in the at least one second mobile electronic device under authorization is found to match the photo or the video, go to Step 360; else, go to Step 370.

Step 360: Send the photo or video to the at least one second mobile electronic device storing the matching facial patterns, and go to Step 370.

Step 362: Scan mobile electronic devices near the first mobile electronic device for confirming whether there is at least one second mobile electronic device installed with the wireless service; when there is at least one second mobile electronic device installed with the wireless service, go to Step 364; else, go to Step 370.

Step 364: Search for at least one authorized second mobile electronic device allowed to access the first mobile electronic device, and go to Step 366.

Step 366: Send the photo or the video to the at least one authorized second mobile electronic device, and go to Step 370.

Step 370: End.

Steps 352-360 correspond to steps shown in FIG. 4, and Steps 362, 364 and 366 correspond to steps shown in FIG. 3. Repeated details are not further described for brevity.

With the aid of embodiments shown in FIGS. 3-5, photo/video sharing is getting much more convenient for users of mobile electronic devices.

(3) Virtual Playlist Sharing/Media File Sharing

In general, conventional portable digital Media players ("DMPs"), which are also mobile electronic devices, are capable of allowing their users to (a) transfer compressed media files from a computer to the mobile electronic device by using an associated transfer management program installed on the computer and utilized for establishing a physical connection to the computer, where the physical connection could be a USB cable; (b) store the compressed media files in a non-volatile memory; (c) decode the compressed media files for playback according to various compression algorithms; (d) convert a compressed or uncompressed digital file to an analog stream, and may potentially process signals of the analog stream to enhance audios and videos of the analog file; (e) process and amplify the signals of the analog stream; and (f) produce high-fidelity audios and videos, which may be played, paused, fast-forwarded, rewound, skipped or replayed instantly and on-demand.

Also, typically in the case of audio DMPs (e.g., the "iPod Nano"), the mobile electronic device may include a relatively small digital display window that provides information regarding the audios stored on the mobile electronic device, where the information may include a title or a name of a performer. The mobile electronic device may also be utilized for viewing (or modifying) a sequence of audios currently stored on the mobile electronic device.

However, data transfer and advanced sorting/sequencing of audio/video selections are difficult or impossible for a user to accomplish unless the DMP is connected to the computer, which does not allow the user to insert new content or make other desirable modifications to original contents stored on the DMP, such as modifying the sequence of the audio/video selections stored on the device while the player device is not physically connected to the computer. Moreover, non-technical users of the audio/video players are usually restricted from creating, editing and managing custom "playlists" (i.e., fixed song sequences), where a user is usually allowed by the mobile electronic device to develop and use a variety of personalized playlists.

Also disadvantageously, the display and user interface on the mobile electronic device are typically limited in size, including the use of multi-functional buttons which are complex for many users and/or are not touch-sensitive, thereby discouraging non-expert users from viewing, modifying, and even sharing the playlists and the sequence of audios stored on the DMP.

Figure 6:
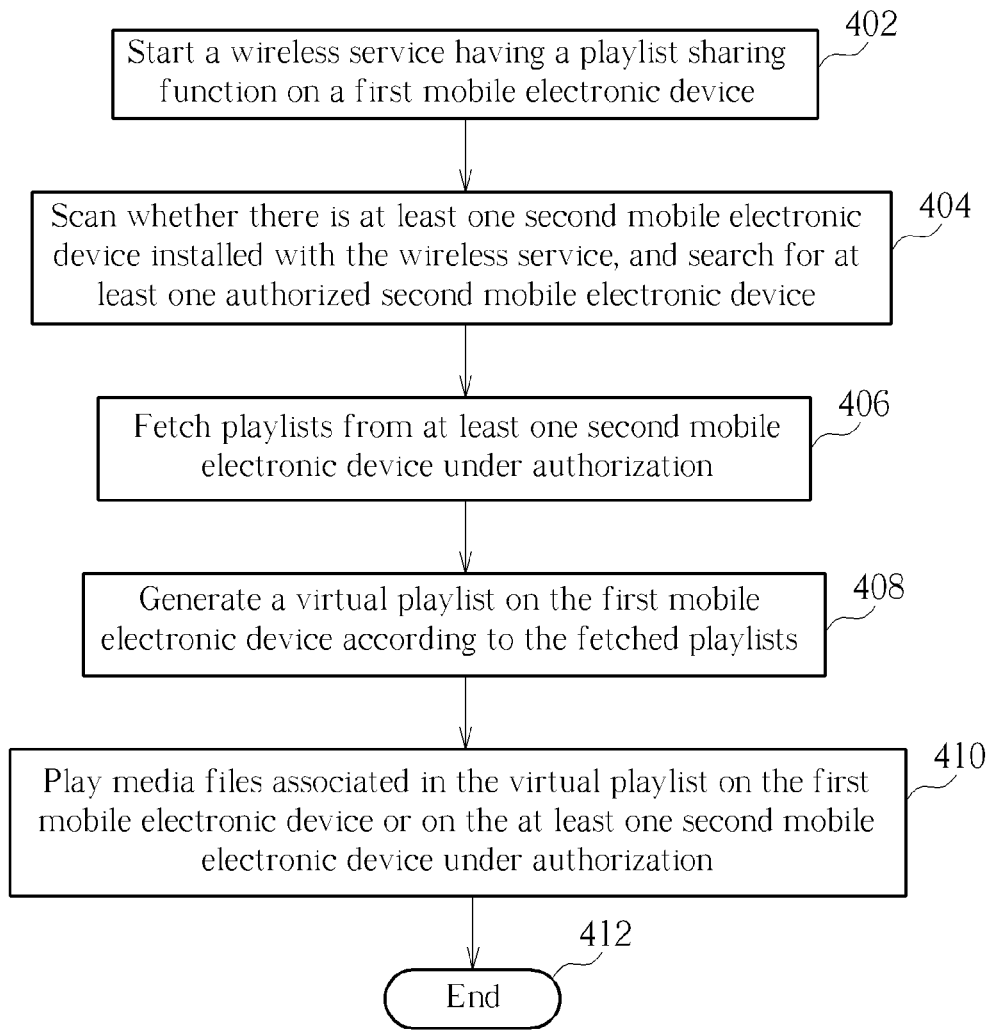
FIG. 6 illustrates a virtual playlist sharing/media file sharing method according to one embodiment of the present invention and based on the wireless service providing method shown in FIG. 1.

Please refer to FIG. 6, which illustrates a virtual playlist sharing/media file sharing method according to one embodiment of the present invention and based on the wireless service providing method shown in FIG. 1. FIG. 6 includes steps as follows:

Step 402: Start a wireless service having a playlist sharing function on a first mobile electronic device, and go to Step 404.

Step 404: Scan mobile electronic devices near the first mobile electronic device for confirming whether there is at least one second mobile electronic device installed with the wireless service, and search for at least one authorized second mobile electronic device allowed to access the first mobile electronic device; when there is at least one second mobile electronic device installed with the wireless device and allowed to access the first mobile electronic device, go to Step 406; else, go to Step 412.

Step 406: Fetch playlists from at least one second mobile electronic device under authorization, and go to Step 408.

Step 408: Generate a virtual playlist on the first mobile electronic device according to the fetched playlists, and go to Step 410.

Step 410: Play media files associated in the virtual playlist on the first mobile electronic device or on the at least one second mobile electronic device under authorization, and go to Step 412.

Step 412: End.

FIG. 6 indicates a specific embodiment of the steps shown in FIG. 1, for example, Step 402 corresponds to Step 102, Step 404 corresponds to Steps 104, 106 and 108, and Steps 406, 408 and 410 correspond to Step 110.

In Step 408, the virtual list may include contents of part or all of playlists from the first mobile electronic device and the at least one nearby mobile electronic device.

In Step 410, when a media file stored in one of the at least one nearby mobile electronic device is browsed on the virtual playlist, the media file may be downloaded, cached, or copied from the at least one nearby mobile electronic device to be played on the first mobile electronic device, or may be directly played by the nearby mobile electronic device storing said media file.

As a result, virtual playlists and associated media files of nearby mobile electronic devices may be shared between said nearby mobile electronic devices, where the media files may include audio files/streams and video files/streams.

(5) Contact List Information Sharing

A mobile electronic device user, such as a mobile phone user, may have multiple groups of contacts in a database of his/her mobile electronic device. Contact groups can be classified into subjects including families, friends, work team members, professional acquaintances, emergency contacts, and etc. One group member of the contact group may maintain a group contact list for the entire contact group and update it periodically. When updates occur, the rest of the members of the contact group have to correspondingly update the group contact list manually, or correctness of the group contact list may fail.

Besides, when a group member intends to update the group contact list, it usually requires complex manual operations at bad timings, e.g., when the group member is busy, for inputting updated information.

Figure 7:
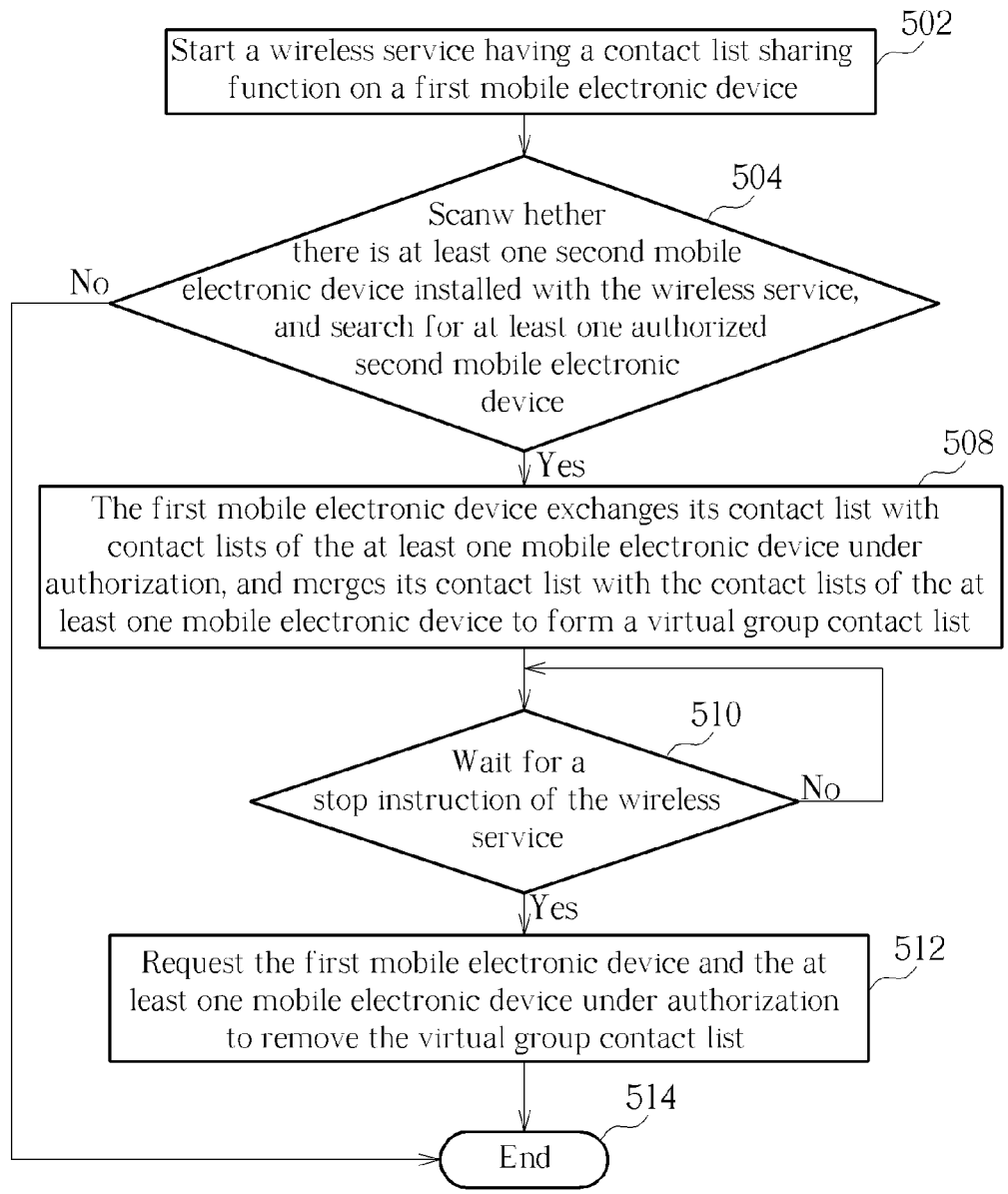
FIGS. 7-8 illustrate a contact list sharing method according to embodiments of the present invention and based on the wireless service providing method shown in FIG. 1.

For preventing inconvenience for a group member to update the group contact list, a contact list sharing method is disclosed in the present invention as shown in FIG. 7 and based on the wireless service providing method shown in FIG. 1. According to a first related embodiment of the present invention, the contact list sharing method shown in FIG. 7 includes steps as follows:

Step 502: Start a wireless service having a contact list sharing function on a first mobile electronic device, and go to Step 504.

Step 504: Scan mobile electronic devices near the first mobile electronic device for confirming whether there is at least one second mobile electronic device installed with the wireless service, and search for at least one authorized second mobile electronic device allowed to access the first mobile electronic device; when there is at least one second mobile electronic device installed with the wireless device and allowed to access the first mobile electronic device, go to Step 508; else, go to Step 514.

Step 508: The first mobile electronic device exchanges its contact list with contact lists of the at least one mobile electronic device under authorization, and merges its contact list with the contact lists of the at least one mobile electronic device to form a virtual group contact list. Go to Step 510.

Step 510: Wait for a stop instruction of the wireless service; if the stop instruction is initiated, go to Step 512; else, go to Step 510.

Step 512: Request the first mobile electronic device and the at least one mobile electronic device under authorization to remove the virtual group contact list, and go to Step 514.

Step 514: End.

FIG. 7 indicates a specific embodiment of the steps shown in FIG. 1, for example, Step 502 corresponds to Step 102, Step 504 corresponds to Steps 104, 106 and 108, and Steps 508, 510 and 512 correspond to Step 110.

In one embodiment of the present invention, the authentication confirmation in Step 504 may be optional.

In Step 508, the contact list sharing is performed for every associated mobile electronic device, inclusive of the first mobile electronic device and the at least one second mobile electronic device under authorization.

In Step 510, the stop instruction may be issued by the first mobile electronic device and/or the at least one second mobile electronic device for stopping the wireless service or to stop utilizing the contact list sharing function.

In Step 512, whether the virtual group contact list is removed from the first mobile electronic device is optional for the user of the first mobile electronic device.

Figure 8:
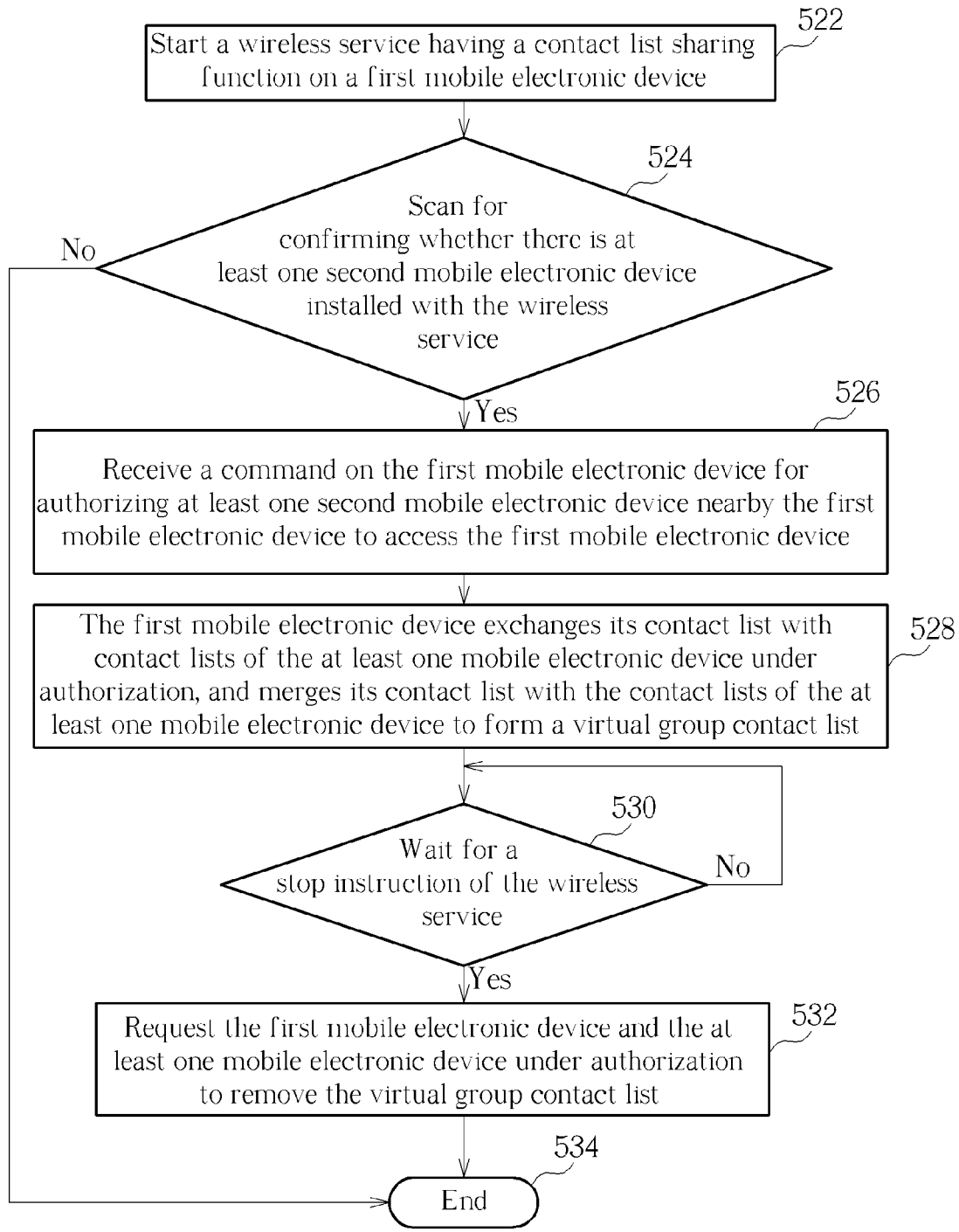

According to a second related embodiment of the present invention, targets of sharing the virtual group contact list can be chosen by the first mobile electronic device, as shown in FIG. 8. According to the second related embodiment of the present invention and based on the wireless service providing method shown in FIG. 1, the contact list sharing method includes steps as follows:

Step 522: Start a wireless service having a contact list sharing function on a first mobile electronic device. Go to Step 524.

Step 524: Scan mobile electronic devices near the first mobile electronic device for confirming whether there is at least one second mobile electronic device installed with the wireless service; when there is at least one second mobile electronic device installed with the wireless device, go to Step 526; else, go to Step 534.

Step 526: Receive a command on the first mobile electronic device for authorizing at least one second mobile electronic device near the first mobile electronic device to access the first mobile electronic device. Go to Step 528.

Step 528: The first mobile electronic device exchanges its contact list with contact lists of the at least one mobile electronic device under authorization, and merges its contact list with the contact lists of the at least one mobile electronic device to form a virtual group contact list. Go to Step 530.

Step 530: Wait for a stop instruction of the wireless service; if the stop instruction is initiated, go to Step 532; else, go to Step 534.

Step 532: Request the first mobile electronic device and the at least one mobile electronic device under authorization to remove the virtual group contact list, and go to Step 534.

Step 534: End.

The difference between steps shown in FIGS. 7 and 8 lies in the authorization, where the user of the first mobile electronic device is allowed to select other nearby mobile electronic devices for authorization, instead of allowing every nearby mobile electronic device installed with the wireless service to share the virtual contact list.

(6) Note Reminding

A popular way to remind people of tasks on his/her to-do-list is to set his/her schedule on mobile electronic devices, such as smart mobile phones. However, when a user of a mobile electronic device meets someone who has important businesses related to the user, it is always not easy to remind the user of the important business so that many missed opportunities for the user occur.

Figure 9:
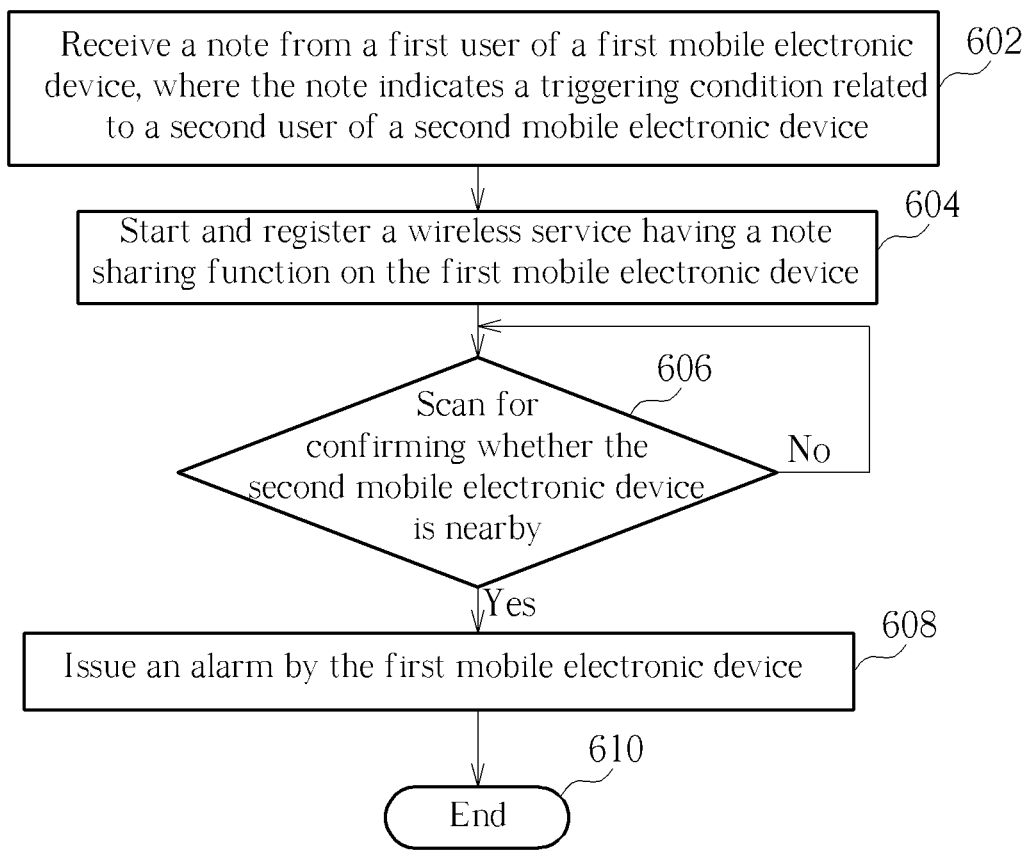
FIG. 9 illustrates a note reminding method based on the wireless service providing method shown in FIG. 1 and according to an embodiment of the present invention

For avoiding such missed opportunities, the present invention discloses a note reminding method based on the wireless service providing method shown in FIG. 1 and according to an embodiment of the present invention, as shown in FIG. 9. The note reminding method includes steps as follows:

Step 602: Receive a note from a first user of a first mobile electronic device, where the note indicates a triggering condition related to a second user of a second mobile electronic device. Go to Step 604.

Step 604: Start and register a wireless service having a note sharing function on the first mobile electronic device. Go to Step 606.

Step 606: Scan for confirming whether the second mobile electronic device is nearby; if the second mobile electronic device is nearby, go to Step 608; else, go to Step 606.

Step 608: Issue an alarm by the first mobile electronic device. Go to Step 610.

Step 610: End.

FIG. 9 indicates a specific embodiment of the steps shown in FIG. 1, for example, Step 604 corresponds to Step 102, Step 606 corresponds to Step 104, and Step 608 corresponds to Step 110.

In Step 608, the alarm could be any form of signals issued from the first mobile electronic device to remind the first user for doing certain important business with the second user, where the important business may also be recorded in the note received in Step 602.

With the aid of the note reminding method shown in FIG. 9, the first user of the first mobile electronic device is unlikely to miss important business opportunities since he or she is always reminded on the moment whenever the second user is near the first user.

(7) Message Sharing

AirLink is a proximity-based P2P framework that allows mobile electronic devices to establish direct connections with each other via Bluetooth, WiFi-Direct and/or the other wireless transport layers. When the AirLink service is activated, the mobile electronic device will broadcast its existence and discover nearby AirLink peers using a globally unique identification string (GUID). It is possible to associate the GUID of the mobile electronic device with user-related information and to craft a messaging system over the AirLink framework that delivers messages to AirLink peers utilizing a respective associated GUID.

Since AirLink is a proximity-based P2P network, by nature, it only sends messages to destinations discovered and directly connected under the AirLink framework.

The present invention discloses a message sharing method to allow mobile electronic devices registered to a proximity-based P2P network, such as the AirLink framework, to forward P2P messages. With the aid of the message sharing method, a P2P message can be delivered to a destination mobile electronic device that is not directly connected to an original sender, i.e., the first mobile electronic device. As a result, a covering range of P2P message transmission can be improved.

Figure 10:
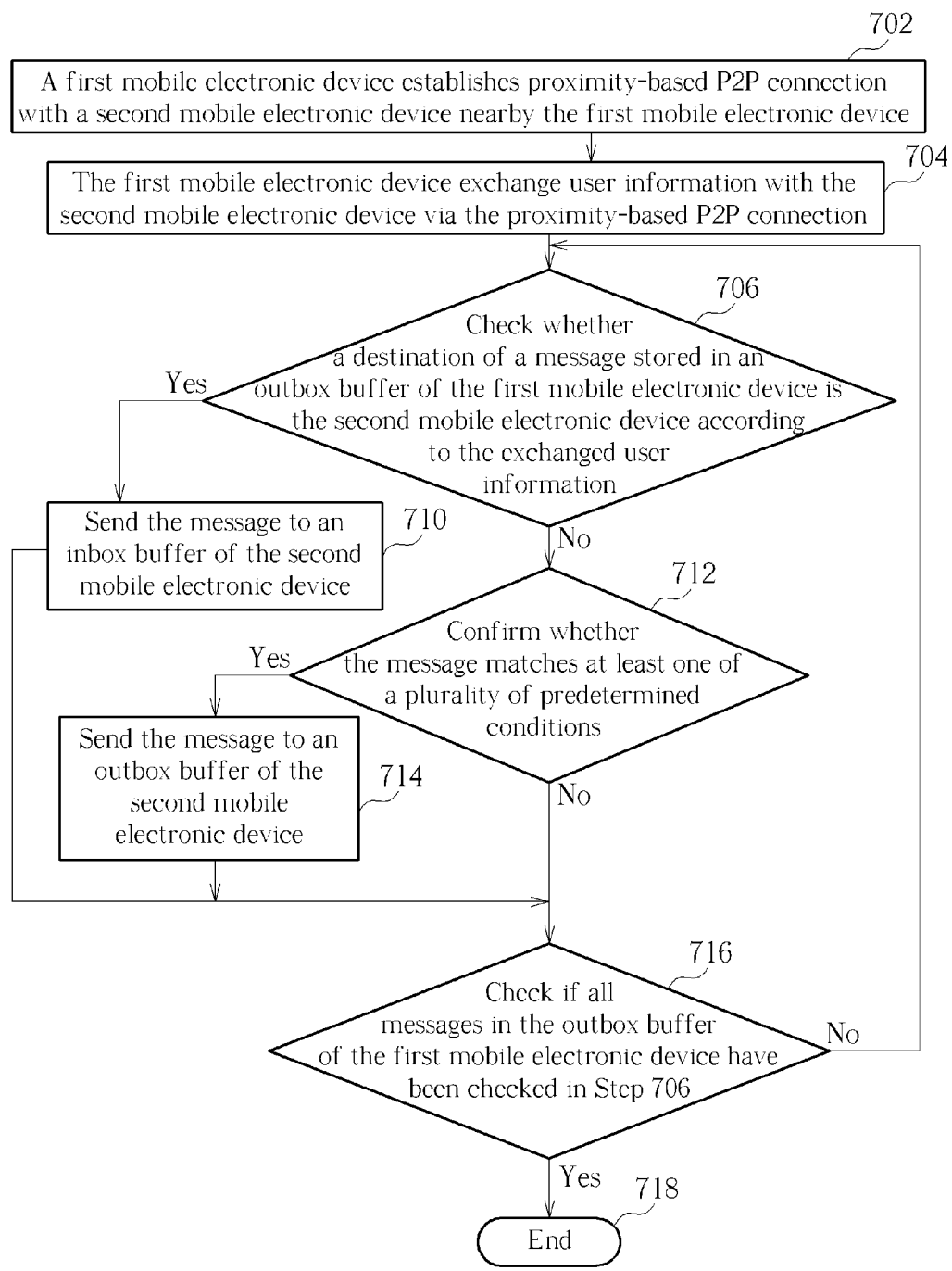
FIG. 10 illustrates a message sharing method according to an embodiment of the present invention.

FIG. 10 illustrates the message sharing method according to an embodiment of the present invention. The sharing method includes steps as follows:

Step 702: A first mobile electronic device establishes proximity-based P2P connection with a second mobile electronic device near the first mobile electronic device. Go to Step 704.

Step 704: The first mobile electronic device exchanges user information with the second mobile electronic device via the proximity-based P2P connection. Go to Step 706.

Step 706: Check whether a destination of a message stored in an outbox buffer of the first mobile electronic device is the second mobile electronic device according to the exchangeable user information. If the destination of the message is the second mobile electronic device, go to Step 710; else, go to Step 712.

Step 710: Send the message to an inbox buffer of the second mobile electronic device, and go to Step 716.

Step 712: Confirm whether the message matches at least one of a plurality of predetermined conditions. When the message matches at least one of the plurality of predetermined conditions, go to Step 714; else, go to Step 716.

Step 714: Send the message to an outbox buffer of the second mobile electronic device, and go to Step 716.

Step 716: Check if all messages in the outbox buffer of the first mobile electronic device have been checked in Step 706. If all the messages in the outbox buffer of the first mobile electronic device have been checked in Step 706, go to Step 718; else, go to Step 706.

Step 718: End.

The plurality of predetermined conditions mentioned in Step 712 may include:

(a) if the message is allowed to be transferred en route of mobile electronic devices other than the first mobile electronic device;
(b) if the second mobile electronic device is allowed to carry and send the message on behalf of the first mobile electronic device;
(c) if the destination of the message exists in a contact list of the second mobile electronic device;
(d) if the second mobile electronic device has proximity with the destination recently, for example, in the last certain number of days;
(e) if the second mobile electronic device has been to a certain geo-location recently, for example, in the last certain number of days;
(f) if the second mobile electronic device is going to head for a certain geo-location in the near future, for example, within a few days into the future, according to a schedule or calendar events of the second mobile electronic device; and
(g) if the time-to-live (TTL) of the message has not been expired.

Figure 11:
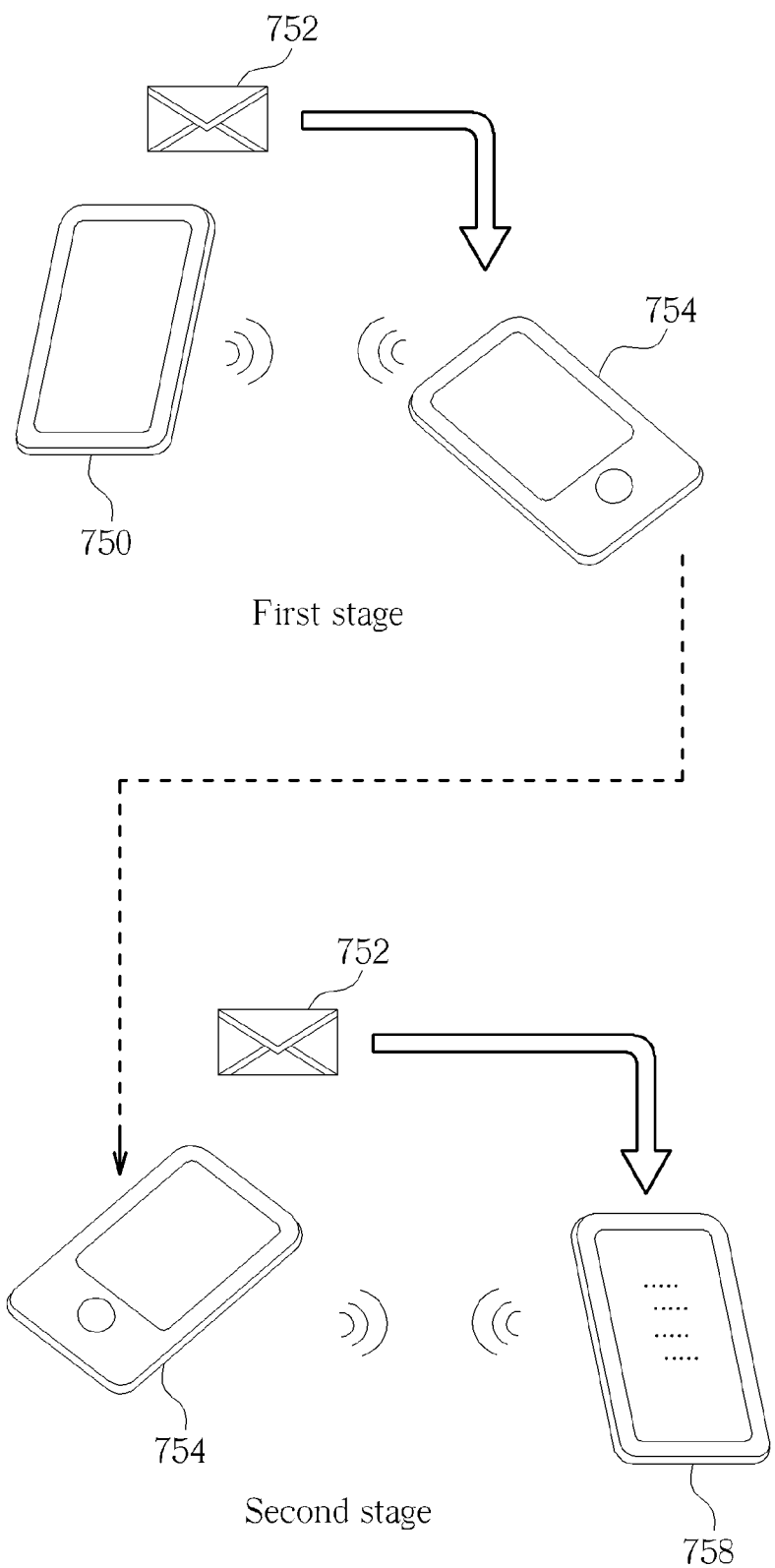
FIG. 11 illustrates an exemplary diagram of performing the message sharing method shown in FIG. 10.

Please refer to FIG. 11, which illustrates an exemplary diagram of performing the message sharing method shown in FIG. 10, where a destination of a message 752 stored in a first mobile electronic device 750 is assumed to be a third mobile electronic device 758, and a second mobile electronic device 754 acts as a medium to transmit the message 752 from the first mobile electronic device 750 to the third mobile electronic device 758.

Each of the mobile electronic devices acquires an inbox buffer and an outbox buffer, where the inbox buffer is utilized for depositing locally-accessible messages, and the outbox buffer is utilized for buffering locally-inaccessible messages and for sending the locally-inaccessible messages when destinations of the locally-inaccessible messages appear.

In a first stage, the first mobile electronic device 750 establishes proximity-based P2P connection with the second mobile electronic device 754 near the first mobile electronic device 750 (Step 702) so that the first mobile electronic device 750 can exchange user information with the second mobile electronic device 754 via the proximity-based P2P connection (Step 704). Then, since the second mobile electronic device 754 is not the destination of the message 752 (Step 706), the above-listed plurality of predetermined conditions is utilized for checking the message 752 (Step 712). Assume that the third mobile electronic device 758 exists in the contact list of the second mobile electronic device 754, then the first mobile electronic device 750 sends the message 752 to the outbox buffer of the second mobile electronic device 754 (Step 714). As long as all the messages in the outbox buffer of the first mobile electronic device 750 have been checked in Step 706, the first stage is finished.

In a second stage, the third mobile electronic device 758 is assumed to be near the second mobile electronic device 754 after a movement of the second mobile electronic device 754. The second mobile electronic device 754 establishes proximity-based P2P connection with the third mobile electronic device 758 (Step 702) so that the second mobile electronic device 754 can exchange user information with the third mobile electronic device 758 via the proximity-based P2P connection (Step 704). Then, since the third mobile electronic device 758 is just the destination of the message 752 (Step 706), the message 752 is sent to the inbox buffer of the third mobile electronic device 758 (Step 710). Therefore, the message 752 reaches its destination.

Note that since the outbox buffer for each of the mobile electronic devices is locally-inaccessible, even if the message 752 is carried by the second mobile electronic device 754, the user of the second mobile electronic device 754 is not allowed to access the message 752 in both the first and second stages for preserving privacy of the message 752.

(8) Multi-Language Communication

The present invention further discloses a multi-language communication method for improving communications between people of different languages. Please refer to FIG. 12, which illustrates the multi-language communication method according to one embodiment of the present invention and based on the wireless service providing method shown in FIG. 1. The multi-language communication method includes steps as follows:

Step 802: Start a wireless service having a multi-language communication function on a first mobile electronic device. Go to Step 804.

Step 804: Scan mobile electronic devices near the first mobile electronic device for confirming whether there is at least one second mobile electronic device installed with the wireless service; when there is at least one second mobile electronic device installed with the wireless device, go to Step 806; else, go to Step 812.

Step 806: Receive text/voice strings by the first mobile electronic device, transmit the text/voice strings to the at least one second mobile electronic device under authorization, and go to Step 808.

Step 808: Translate the text/voice strings by the at least one second mobile electronic device under authorization according to a language setting of the at least one second mobile electronic device, and go to Step 810.

Step 810: Display translated text/voice strings by the at least one mobile electronic device, and go to Step 812.

Step 812: End.

Figure 12:
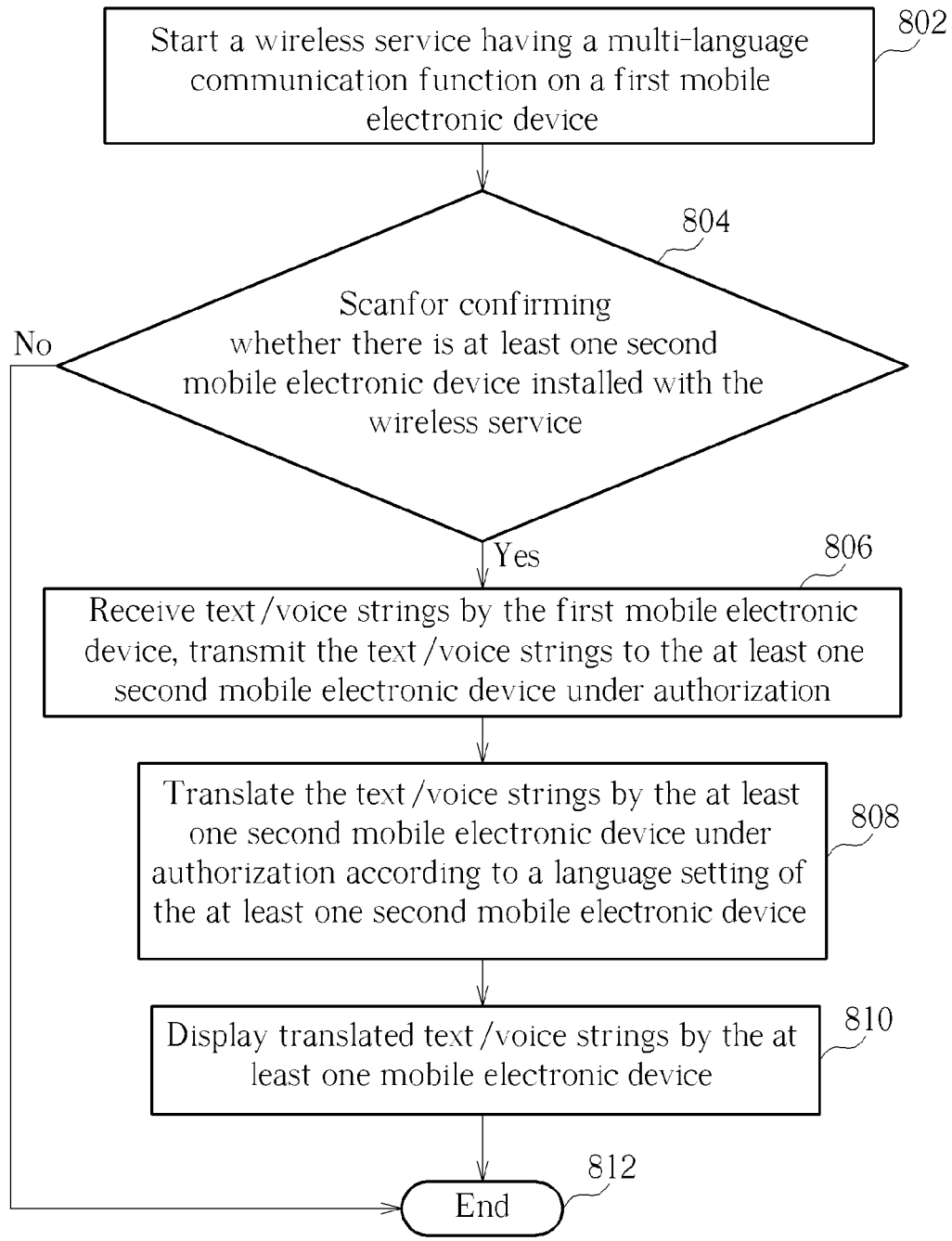
FIG. 12 illustrates the multi-language communication method according to one embodiment of the present invention and based on the wireless service providing method shown in FIG. 1.

FIG. 12 indicates a specific embodiment of the steps shown in FIG. 1, for example, Step 802 corresponds to Step 102, Step 804 corresponds to Steps 104, 106 and 108, and Steps 806, 808 and 810 correspond to Step 110.

With the aid of the embodiment shown in FIG. 12, people of different languages may conveniently and instantly communicate with each other with the aid of the wireless service providing method of the present invention.

(9) Conference Communication

In ordinary companies, meetings are always held by gathering several people together or nearby. Notes, charts, or any forms of readable data are always required to be manually shared during the meeting, however.

Figure 13:
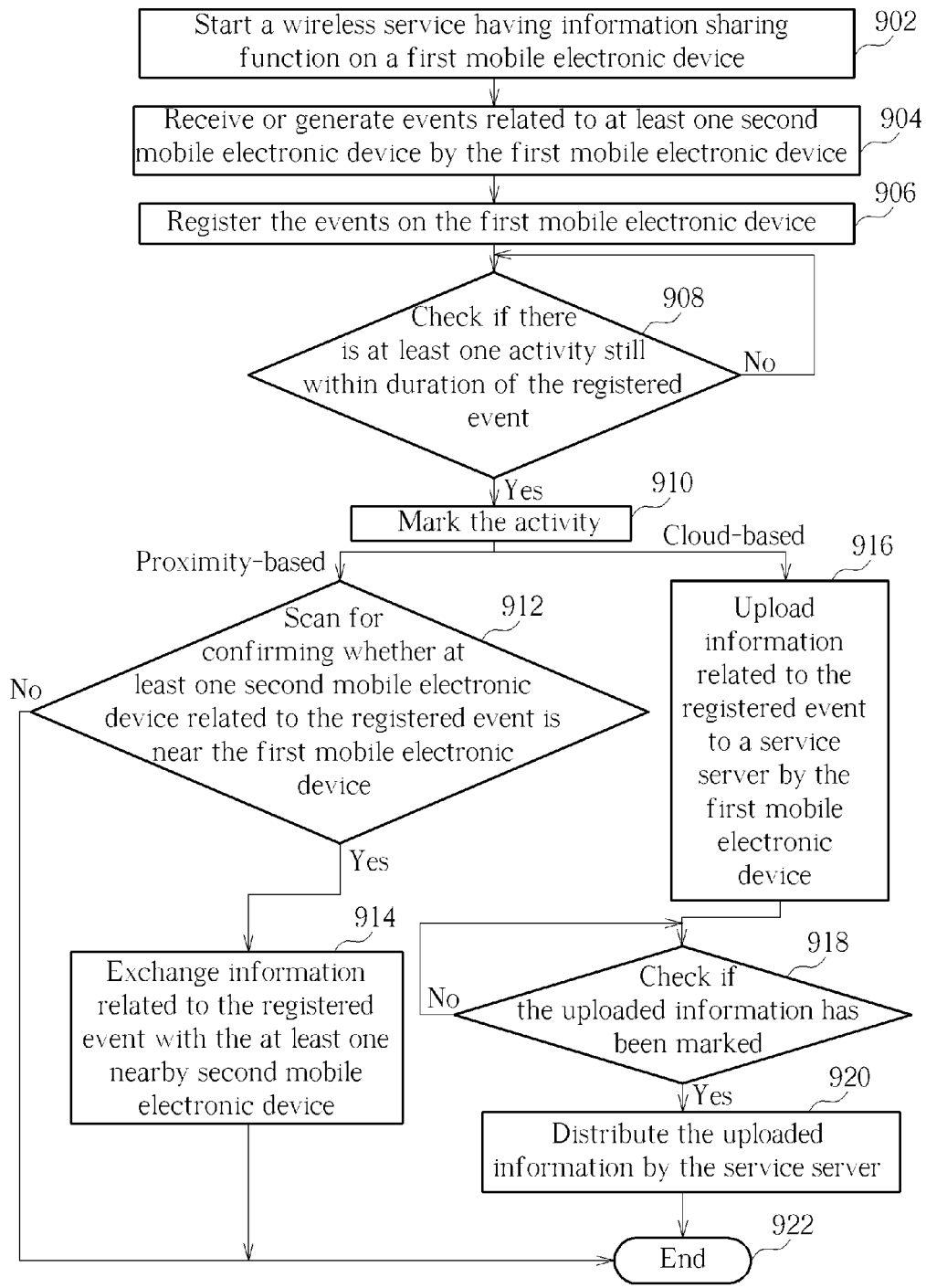
FIG. 13 illustrates discloses an information sharing method based on the wireless service providing method shown in FIG. 1 and according to an embodiment of the present invention.

For improving information communications during the meeting, the present invention discloses an information sharing method based on the wireless service providing method shown in FIG. 1 and according to an embodiment of the present invention, as shown in FIG. 13. The information communication method includes steps as follows:

Step 902: Start a wireless service having information sharing function on a first mobile electronic device, and go to Step 904.

Step 904: Receive or generate events related to at least one second mobile electronic device by the first mobile electronic device. Go to Step 906.

Step 906: Register the events on the first mobile electronic device. Go to Step 908.

Step 908: Check if there is at least one activity utilized for triggering a registered event on the first mobile electronic device and if it is still within duration of the registered event; if so, go to Step 910; else, go to Step 908.

Step 910: Mark the activity in correspondence with the registered events on the first mobile electronic device. If the communication between the first mobile electronic device and the at least one second mobile electronic device is proximity-based, go to Step 912; else, if the communication between the first mobile electronic device and the at least one second mobile electronic device is cloud-based, go to Step 916.

Step 912: Scan for confirming whether at least one second mobile electronic device related to the registered event is near the first mobile electronic device; when the at least one second mobile electronic device related to the registered event is near the first mobile electronic device, go to Step 914; else, go to Step 922.

Step 914: Exchange information related to the registered event with the at least one nearby second mobile electronic device when the registered event is triggered. Go to Step 922.

Step 916: Upload information related to the registered event to a service server by the first mobile electronic device. Go to Step 918.

Step 918: Check if the uploaded information has been marked. If the uploaded information has been marked, go to Step 920; else, go to Step 922.

Step 920: Distribute the uploaded information by the service server when the registered event is triggered. Go to Step 922.

Step 922: End.

The steps shown in FIG. 13 may primarily be utilized in a meeting. For example, a participant of a meeting may activate the wireless service having the information sharing function (Step 902) before or during the meeting. The participant then creates a specific event related to other participants of the meeting (Step 904), according to calendars or schedules of the other participants.

The event is then registered on the first mobile electronic phone held by the participant (Step 906). If an activity for triggering the event is still within its own duration (the event is not triggered yet), the activity will be marked (Steps 908 and 910) as a preparation of the triggering.

If communications between participants of the meeting are proximity-based, mobile electronic devices near the participant are scanned (Step 912), and information related to the event is shared by all the participant of the meeting when the event is triggered (Step 914), for example, when the participant would like to introduce the sales of his company and send sales information to the other participants of the meeting.

If communications between participants of the meeting is cloud-based, the information is uploaded to the service server in advance (Step 916) and checked if it is marked in the service server (Step 918). When the event is triggered, the information will be distributed to participants of the meeting by the service server (Step 920).

In other embodiments of the present invention related FIG. 1, the method for mobile electronic devices to recognize each other before providing the wireless service may be based on whether a response signal is received in response to a broadcast signal, i.e. handshaking. In the following-described embodiments of the present invention, the handshaking technique is applied. The embodiments are described in several topics related to the above-mentioned applications:

(1-A) Group-Buying

Figure 14:
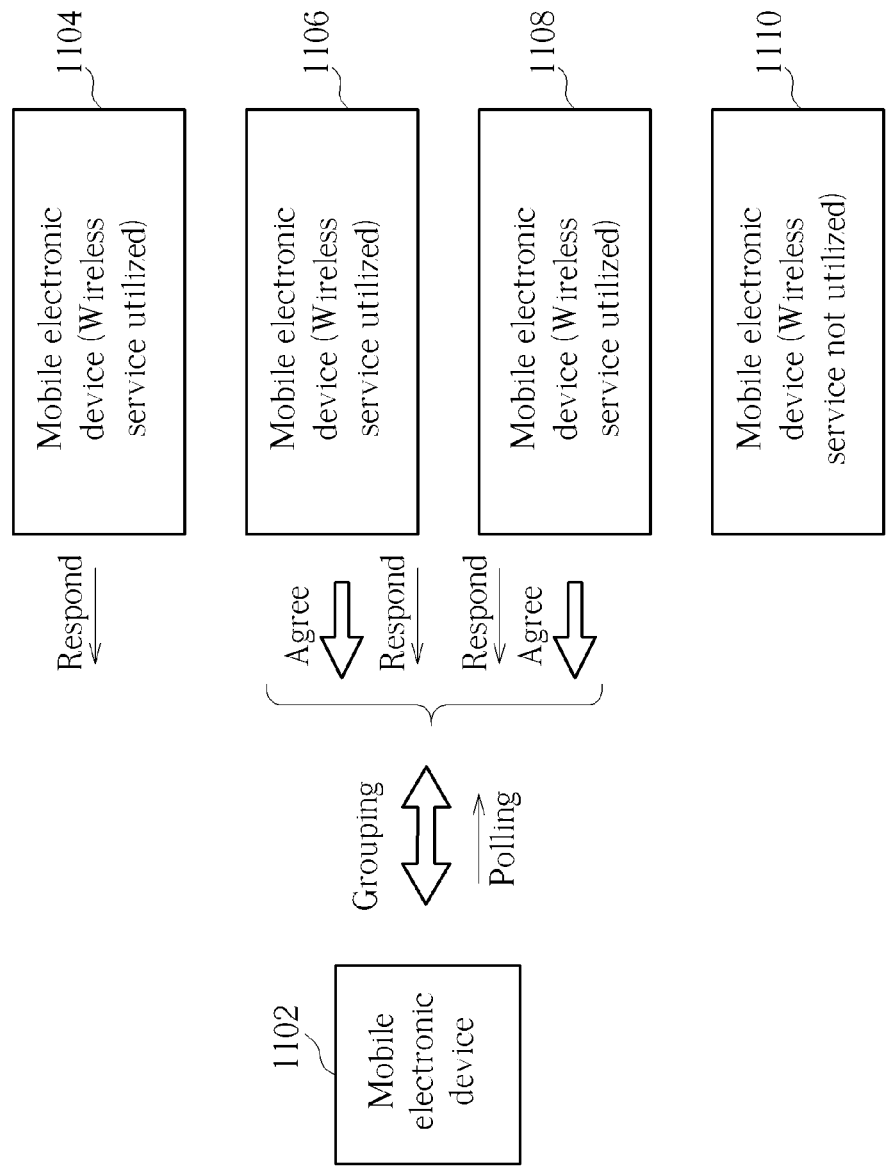
FIG. 14 is utilized for helping explaining how a grouping method disclosed in the present invention works between mobile electronic devices of potential buyers according to one embodiment of the present invention.

Please refer to FIG. 14, which is utilized for helping explaining how the grouping method works between mobile electronic devices of potential buyers according to one embodiment of the present invention. In FIG. 14, a mobile electronic device 1102 of a user intending to initiate a group-buying action is assumed to be installed with a wireless communication protocol for executing a grouping function based on the disclosed grouping method of the present invention and supported by the wireless communication protocol. A plurality of mobile electronic devices 1104, 1106, 1108 and 1110 are assumed to be located within a maximal range for responding to the mobile electronic device 1102, i.e., within its proximity. The mobile electronic devices 1104, 1106 and 1108 are assumed to utilize the wireless communication protocol. The mobile electronic device 1110 is assumed to not utilize the wireless communication protocol.

Figure 15:
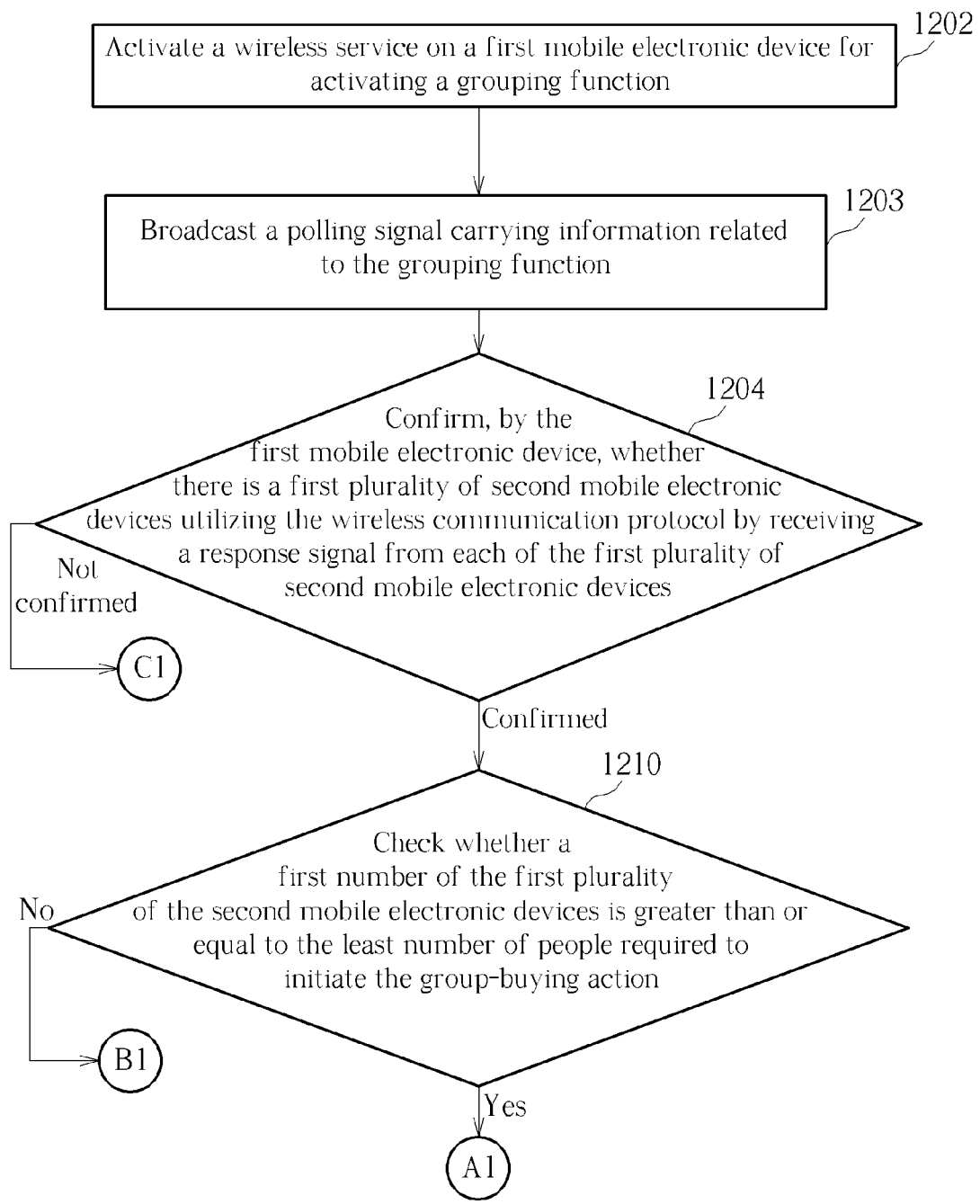
FIG. 15 and FIG. 16 illustrate a flowchart of the grouping method of the present invention for group-buying based on a wireless communication protocol according to one embodiment of the present invention.
Figure 16:
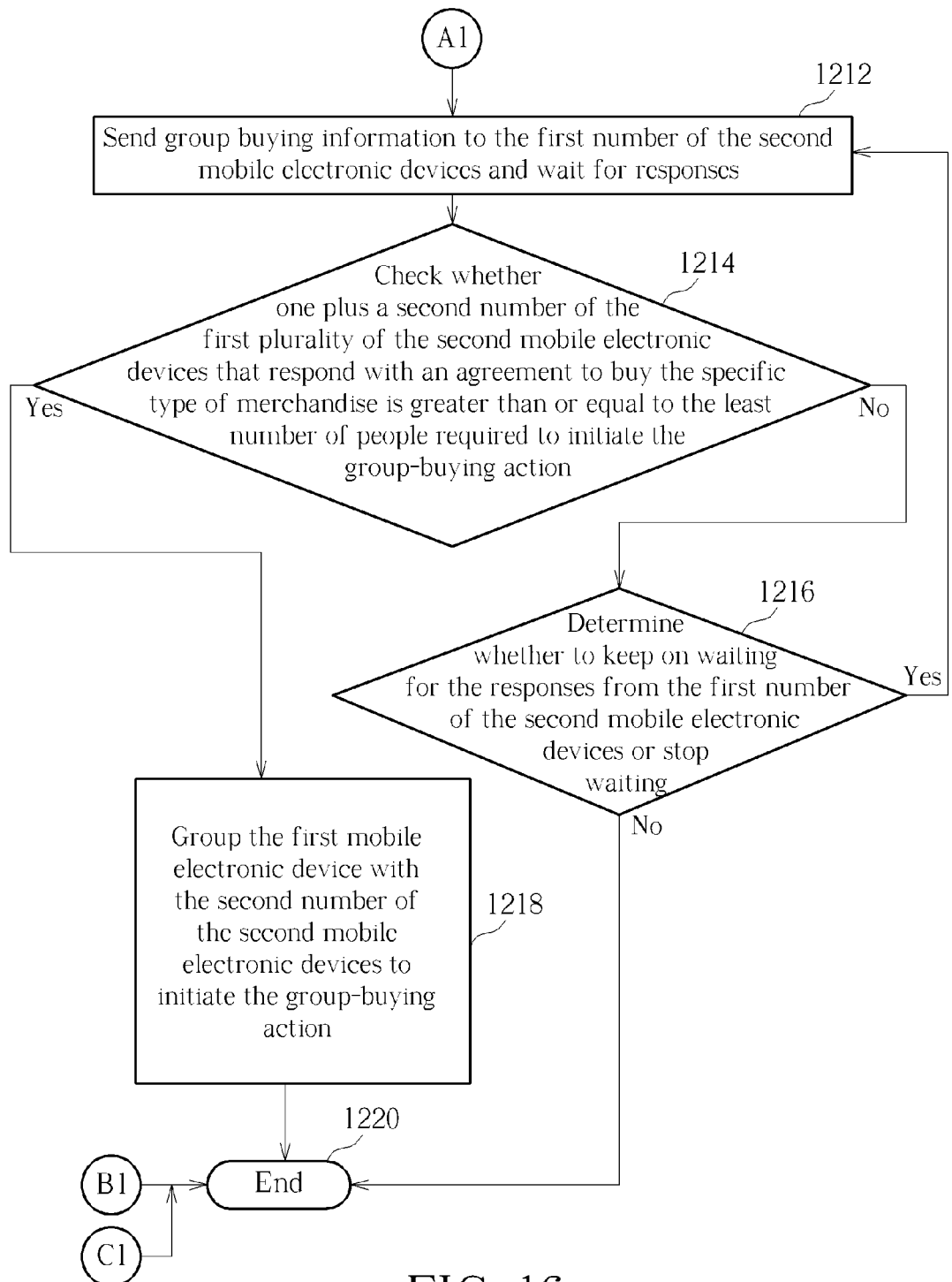

Please refer to FIG. 15 and FIG. 16, which disclose the grouping method of group purchasing according to one embodiment of the present invention, where the disclosed grouping method can be utilized by part of mobile electronic devices shown in FIG. 14. The disclosed grouping method includes steps as follows:

Step 1202: Activate a wireless communication protocol on a first mobile electronic device for activating a grouping function provided by the wireless communication protocol to initiate a group-buying action to buy a specific type of merchandise, and go to Step 1203.

Step 1203: Broadcast a polling signal carrying information related to the grouping function, and go to Step 1204.

Step 1204: Confirm, by the first mobile electronic device, whether there is a first plurality of second mobile electronic devices utilizing the wireless communication protocol by receiving a response signal from each of the first plurality of second mobile electronic devices, where the response signal is in response to the polling signal; when the first plurality of second mobile electronic devices is confirmed, go to Step 1210; else, go to Step 1220.

Step 1210: Check whether one plus a first number of the first plurality of the second mobile electronic devices is greater than or equal to the least number of people required to initiate the group-buying action; when one plus the first number is greater than or equal to the least number of people required to initiate the group-buying action, go to Step 1212; else, go to Step 1220.

Step 1212: Send group buying information to the first number of the second mobile electronic devices and wait for responses from the first number of the second mobile electronic devices.

Step 1214: Check whether one plus a second number of the first plurality of the second mobile electronic devices that respond with an agreement to buy the specific type of merchandise is greater than or equal to the least number of people required to initiate the group-buying action; when the second number is greater than or equal to the least number of people required to initiate the group-buying action, go to Step 1218; else, go to Step 1216.

Step 1216: Determine whether to keep on waiting for the responses from the first number of the second mobile electronic devices or stop waiting; if it is determined to keep on waiting, go to Step 1212; if it is determined to stop waiting, go to Step 1220.

Step 1218: Group the first mobile electronic device with the second number of the second mobile electronic devices to initiate the group-buying action, and go to Step 1220.

Step 1220: End.

How the steps shown in FIG. 15 and FIG. 16 work will be explained with the aid of the mobile electronic devices 1102, 1104, 1106, 1108 and 1110 shown in FIG. 14. The first mobile electronic device mentioned in the steps shown in FIG. 15 and FIG. 16 indicates the mobile electronic device 1102 shown in FIG. 14. The second mobile electronic devices mentioned in the steps shown in FIG. 15 and FIG. 16 may include the mobile electronic device 1104, 1106 and 1108.

The user of the mobile electronic device 1102 may encounter a specific type of merchandise he/she wants by accident while walking on streets so that the user is motivated to gather enough people to issue a group-buying action to buy the specific type of merchandise with a discounted price. In Step 1202, the wireless communication protocol is activated on the mobile electronic device 1102 by the user so that the grouping function supported by the wireless communication protocol can also be activated.

In Step 1203, the mobile electronic device 1102 broadcasts a polling signal, carrying information related to the grouping function, for receiving response signals in response to the polling signal in Step 1204, where the response signals are sent by other mobile electronic devices utilizing the wireless communication protocol. As a result, the mobile electronic devices 1104, 1106 and 1108 will respond to the mobile electronic device 1102 by sending the response signals since the wireless communication protocol is utilized on the mobile electronic devices 1104, 1106, and 1108, whereas the mobile electronic device 1110 will not respond to the mobile electronic device 1102 since the wireless communication protocol is not utilized on the mobile electronic device 1110.

In Step 1204, the mobile electronic device 1102 confirms that the wireless communication protocol is utilized by the mobile electronic devices 1104, 1106 and 1108 by receiving the response signals respectively.

In Step 1210, the mobile electronic device 1102 checks whether a first number of mobile electronic devices found in Step 1204 with the wireless communication protocol being utilized, i.e. the mobile electronic devices 1104, 1106 and 1108, is larger than or equal to a least number of people required to initiate the group-buying action, where the first number is currently equals to three. As an example, the least number of people required to initiate the group-buying action may be two. Since there are three mobile electronic devices 1104, 1106 and 1108 utilizing the wireless communication protocol, i.e. when the first number is greater than the least number of people required to initiate the group-buying action, the check in Step 1210 can be passed, and the execution flow then goes to Step 1212. Otherwise, when the first number is smaller than the least number of people required to initiate the group-buying action, the execution flow goes to Step 1220 so that the mobile electronic device 1102 stops the grouping function.

In Step 1212, the mobile electronic device 1102 sends group-buying information about the specific type of merchandise as a group-buying request to the mobile electronic devices 1104, 1106 and 1108 and waits for responses from the mobile electronic devices 1104, 1106 and 1108. Therefore, users of the mobile electronic devices 1104, 1106 and 1108 may respond to the mobile electronic device 1102 about the group-buying information to indicate respective wills to join the group-buying action. In one embodiment of the present invention, the group-buying information may include an authentication code and a service identity of the grouping function so that the users of the mobile electronic devices 1104, 1106 and 1108 may recognize the grouping function via the service identity of the grouping function, join the group-buying action by granting the authentication code, and return an agreement to the mobile electronic device 1102 according to the action of granting the authentication code.

In Step 1214, the mobile electronic device 1102 checks the returned agreements from the mobile electronic devices 1104, 1106 and 1108 for confirming agreements of joining the group-buying action from the users of the mobile electronic devices 1104, 1106 and 1108. Assume the mobile electronic device 1102 receives agreements from the mobile electronic devices 1106 and 1108, then the second number mentioned in Step 1214 equals to two. Since one plus the second number, which indicates the mobile electronic device 1102 plus the second number of mobile electronic devices 1106 and 1108, is currently larger than or equal to the least number of people required to initiate the group-buying action, where the least number is assumed to be equal to two by following the above-mentioned example, it means that the user of the mobile electronic device 1102 has found enough people to initiate the group-buying action, and the execution flow will go to Step 1218; else, it means that the user of the mobile electronic device 1102 has not found enough people to initiate the group-buying action so that the execution flow will go to Step 1216.

In Step 1216, the mobile electronic device 1102 may determine to keep on waiting for responses from mobile electronic devices that have not respond to the mobile electronic device 1102 or stop waiting, according to a maximal waiting time for reply and a confidence value set by the mobile electronic device 1102. When it is determined to keep on waiting, the execution flow goes back to Step 1212. When it is determined to stop waiting, the execution flow goes to Step 1220. The mechanism of waiting for the responses may also be utilized in Step 1212.

In one embodiment of the present invention, within a predetermined duration, a loop including Step 1212, Step 1214, and Step 1216 is periodically repeated. Therefore, when Step 1212 is repeated, the group buying information may be kept on being sent to those who have not responded with an agreement to buy the specific type of merchandise before expiration of the predetermined duration, or before declinations from all those people who have not responded with the agreement are received by the mobile electronic device 1102. The predetermined duration and whether to wait for all the declinations or not can be set on the mobile electronic device 1102 by its user as an external input.

In Step 1218, since there are enough agreements to initiate the group-buying action for the specific type of merchandise, the mobile electronic device 1102 groups the mobile electronic device 1102 with the mobile electronic devices 1106 and 1108 responding with agreements so as to initiate the group-buying action for buying the specific type of merchandise with a discount.

In one embodiment of the present invention, Step 1212, Step 1214, Step 1216 and Step 1218 can be performed by using a pairing program of the grouping function, which is supported by the wireless communication protocol utilized on the mobile electronic device 1102.

The embodiment shown in FIGS. 14-16 discloses a grouping method of group-buying based on a wireless communication protocol. With the aid of the grouping method shown in FIGS. 14-16, when a customer who encounters a specific type of merchandise he/she wants by accident, he/she is able to ask for agreements from neighboring people who want the same type of merchandise by using a wireless communication protocol and to group himself/herself with people who respond with agreements by using the wireless communication protocol. After grouping, a group-buying action can be initiated, and a discount of the specific type of merchandise can be retrieved by the grouped people.

A non-transitory machine readable media may be utilized for storing computer codes programmed according to the grouping method of the present invention, such as the grouping method disclosed in FIGS. 14-16, so that the stored computer codes may be run by a processor of any kind of mobile electronic device to fulfill the purpose of the present invention.

(6-A) Note Reminding

Figure 17:
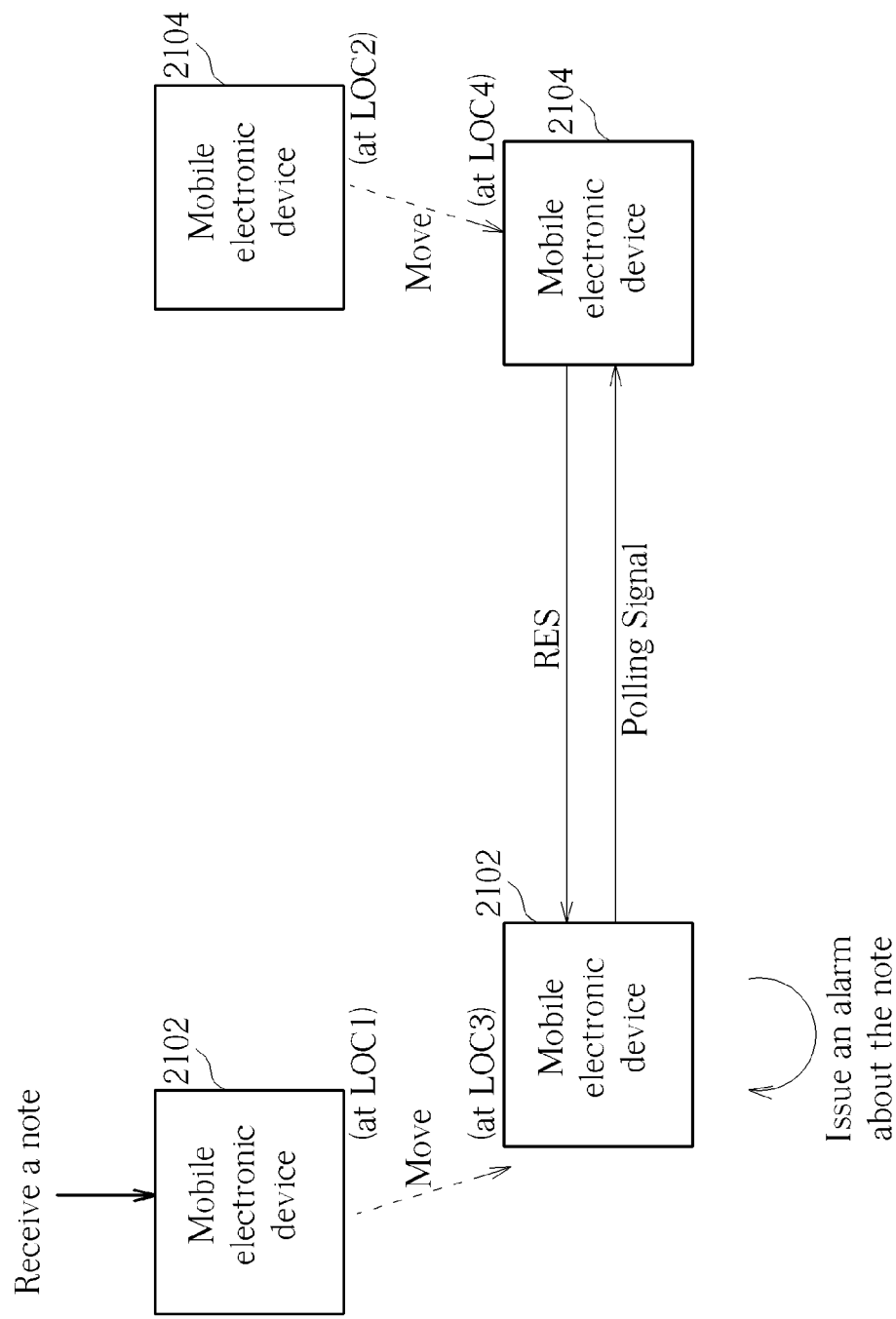
FIG. 17 illustrates a first mobile electronic device and a second mobile electronic device for explaining the reminding method disclosed in the present invention.

Please refer to FIG. 17, which illustrates a first mobile electronic device 2102 and a second mobile electronic device 2104 for explaining the reminding method disclosed in the present invention. It is assumed that a user of the first mobile electronic device 2102 has a scheduled issue to be discussed with a user of the second mobile electronic device 2104, where the first mobile electronic device 2102 is originally located at a first location LOC1, the second mobile electronic device 2104 is located a second location LOC2, and a previous distance between the mobile electronic devices 2102 and 2104 is larger than a maximal distance for both the mobile electronic devices 2102 and 2104 to transmit information to each other.

When the user of the first mobile electronic device 2102 and the user of the second mobile electronic device 2104 meets by accident, for example, the first mobile device 2102 is assumed to be moved from the first location LOC1 to a third location LOC3, and the second mobile device 2104 is assumed to be moved from the second location LOC2 to a fourth location LOC4, and a distance from the third location LOC3 to the fourth location LOC4 is smaller than the above-mentioned maximal distance for both the mobile electronic devices 2102 and 2104 to transmit information to each other.

A background example for FIG. 17 is assumed as the following description: The user of the first mobile electronic device 2102 intends to have an important but unscheduled discussion with a user of the second mobile electronic device 2104. For reminding himself of the discussion when unexpectedly meeting the user of the second mobile electronic device 2104 in the future, the user of the first mobile electronic device 2102 writes a message targeting the second mobile electronic device 2104 to the first mobile electronic device 2102 in advance as a reminder, where the message targeting the second mobile electronic device 2104 means a purpose of the message is directly related to the second mobile electronic device 2104.

Figure 18:
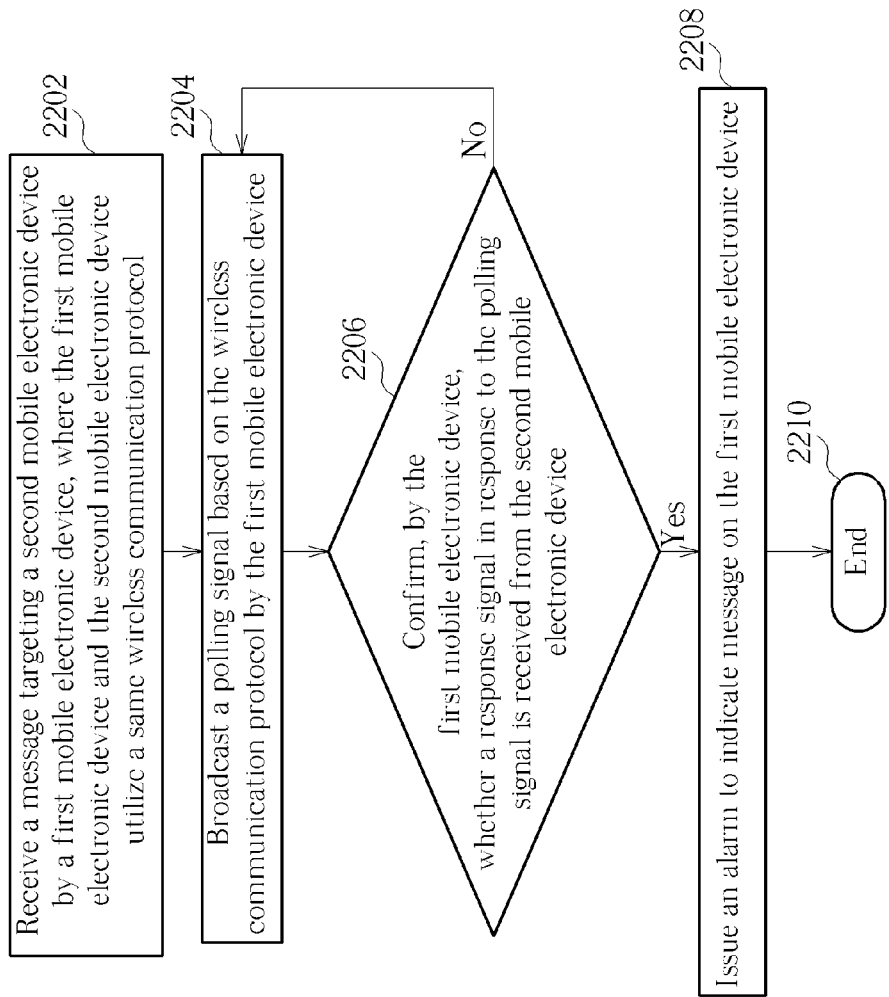
FIG. 18 disclosed the reminding method according to an embodiment of the present invention, where the reminding method is performed on the first and second mobile electronic devices shown in FIG. 17.

Please refer to FIG. 18, which disclosed the reminding method according to an embodiment of the present invention, where the reminding method is performed on the mobile electronic devices 2102 and 2104 shown in FIG. 17. As shown in FIG. 18, the reminding method includes steps as follows:

Step 2202: Receive a message targeting a second mobile electronic device by a first mobile electronic device, where the first mobile electronic device and the second mobile electronic device utilize a same wireless communication protocol, and go to Step 2204.

Step 2204: Broadcast a polling signal based on the wireless communication protocol by the first mobile electronic device, and go to Step 2206.

Step 2206: Confirming, by the first mobile electronic device, whether a response signal in response to the polling signal is received from the second mobile electronic device; if the response signal is received by the first mobile electronic device, go to Step 2208; else, go to Step 2204.

Step 2208: Issue an alarm to indicate message on the first mobile electronic device, and go to Step 2210.

Step 2210: End.

The following description basically follows the exemplary condition about FIG. 17.

In Step 2202, the first mobile electronic device 2102 currently located at the first location LOC1 receives the message from the user of the first mobile electronic device 2102. Note that the wireless communication protocol may not be activated when the first mobile electronic device 2102 is located at the first location LOC1. The user of the first mobile electronic device 2102 issues a message to the first mobile electronic device 2102 as a future reminder, where the message is set to be triggered when the first mobile electronic device 2102 receives a response signal in the future.

In Step 2204, the wireless communication protocol is activated so that the first mobile electronic device 2102 can start broadcasting a polling signal in a dynamic manner, for confirming whether the response signal RES in response to the polling signal is received in Step 2206.

If in Step 2204 and Step 2206, the current location of the first mobile electronic device 2102 is moved from the first location LOC1 to the third location LOC3, and the current location of the second mobile electronic device 2104 is moved from the second location LOC2 to the fourth location LOC4 so that a current distance from the first mobile electronic device 2102 to the second mobile electronic device 2104 is shorter than the maximal distance for both the mobile electronic devices 2102 and 2104 to transmit information to each other. Therefore, at this time, the second mobile electronic device 2104 is capable of responding to the polling signal by issuing the response signal RES.

In Step 2208, an alarm is issued by the first mobile electronic device 2102 itself on the first mobile electronic device 2102 to remind the user of the message previously issued to the first mobile electronic device 2102.

Otherwise, in Step 2204 and Step 2206, if the first mobile electronic device 2102 does not receive the response signal RES from the second mobile electronic device 2104, Step 2204 will be performed again so that the first mobile electronic device 2102 keeps on broadcasting the polling signal, till receiving the response signal RES.

In one embodiment of the present invention, a predetermined time, a predetermined location, or both may be assigned along with the message when the message is issued to the first mobile electronic signal; therefore, when the predetermined time, the predetermined location, or both is reached, the first mobile electronic device 2102 will start broadcasting the polling signal to confirm whether the response signal RES is received.

In embodiments of the present invention, the alarm could be any form of signals issued from the first mobile electronic device 2102 to remind its user, for example, text messages, flashes, vibrations, or sounds.

With the aid of the reminding method shown in FIG. 18, the user of the first mobile electronic device 2102 is unlikely to miss important business opportunities or discussions with the user of the second mobile electronic device 2104 since he or she is always reminded on-time whenever the response signal RES is received by the first mobile electronic device 2102 for confirming that the second mobile electronic device 2104 falls within a reachable communication range of the first mobile electronic device 2102.

A non-transitory machine readable media may be utilized for storing computer codes programmed according to the reminding method of the present invention, such as the reminding method disclosed in FIGS. 17-18, so that the stored computer codes may be run by a processor of any kind of mobile electronic device to fulfill the purpose of the present invention.

(5-A) Contact List Sharing

Figure 19:
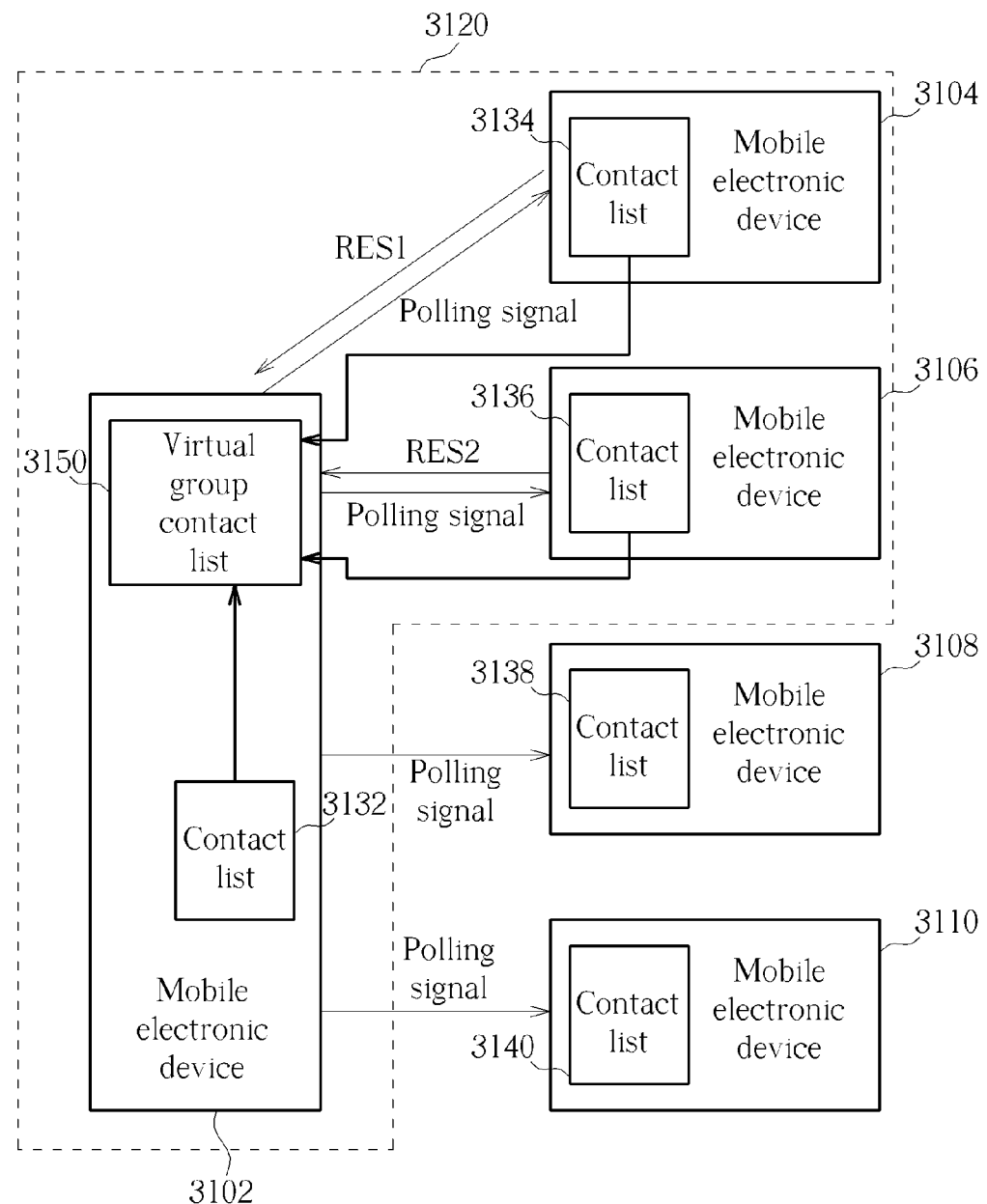
FIG. 19 illustrates a first mobile electronic device and a plurality of second mobile electronic devices for explaining the contact list sharing method of the present invention.

Please refer to FIG. 19, which illustrates a mobile electronic device 3102 and a plurality of mobile electronic devices 3104, 3106, 3108 and 3110 for explaining the contact list sharing method of the present invention, where the mobile electronic devices 3102, 3104, 3106, 3108 and 3110 respectively have contact lists 3132, 3134, 3136, 3138 and 3140.

The mobile electronic device 3102 is configured to broadcast a polling signal based on a wireless communication protocol, such as the above-mentioned wireless communication protocols. The mobile electronic devices 3104, 3106, 3108, and 3110 are assumed to receive the polling signal, however, only the mobile electronic devices 3104 and 3106 are assumed to utilize the same wireless communication protocol that the mobile electronic device 3102 utilizes. Therefore, each of the mobile electronic devices 3104 and 3106 responds the mobile electronic device 3102 with a response signal RES1 or RES2.

In embodiments of the present invention, since the wireless communication protocol is based on near field communication, some other mobile electronic devices utilizing the wireless communication protocol and falling outside of the capability of the mobile electronic device 3102 in broadcasting the polling signal will not receive nor respond to the polling signal.

After receiving the response signals RES1 and RES2, the mobile electronic device 3102 is able to confirm existence of both the mobile electronic devices 3104 and 3106.

It is assumed that a user of the mobile electronic device 3102 intends to contact a wanted user whose contact information does not exist in the contact list 3132, where the contact information may be stored in at least one of the mobile electronic devices 3104 and 3106. With the aid of the disclosed contact list sharing method, a virtual contact list merging a plurality of contact lists from the mobile electronic devices 3102, 3104, and 3106 is retrieved so that the contact information of the wanted user may also be included in the virtual group contact list. As a result, contact information of the wanted user may be accessed by the user of the mobile electronic device 3102 via accessing the virtual group contact list.

Figure 20:
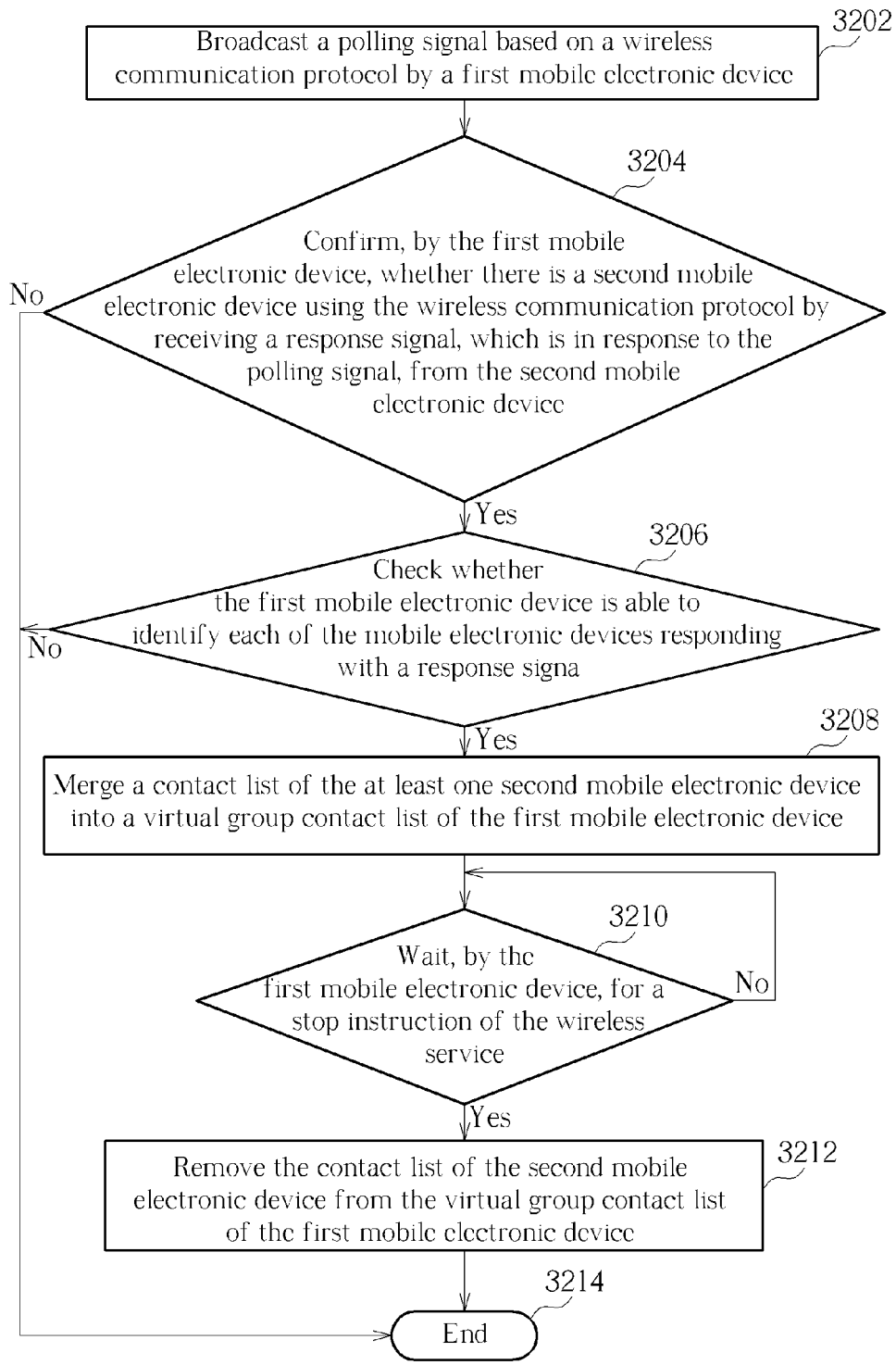
FIG. 20 and FIG. 21 illustrate the contact list sharing method according to two embodiments of the present invention.

Please refer to FIG. 20, which illustrates the contact list sharing method according to a first related embodiment of the present invention. As shown in FIG. 20, the contact list sharing method shown in FIG. 20 includes steps as follows:

Step 3202: Broadcast a polling signal based on a wireless communication protocol by a first mobile electronic device, and go to Step 3204.

Step 3204: Confirm, by the first mobile electronic device, whether there is a second mobile electronic device using the wireless communication protocol by receiving a response signal, which is in response to the polling signal, from the second mobile electronic device; when there is the at least one second mobile electronic device using the wireless communication protocol is confirmed, go to Step 3206; else, go to Step 3214.

Step 3206: Check whether the first mobile electronic device is able to identify each of the mobile electronic devices responding with a response signal; for those mobile electronic devices that can be identified by the first mobile electronic device, go to Step 3208; for other mobile electronic devices that cannot be identified by the first mobile electronic device, go to Step 3214.

Step 3208: Merge a contact list of the at least one second mobile electronic device into a virtual group contact list of the first mobile electronic device, and go to Step 3210.

Step 3210: Wait, by the first mobile electronic device, for a stop instruction of the wireless communication protocol; if the stop instruction is received, go to Step 3212; else, go to Step 3210.

Step 3212: Remove the contact list of the second mobile electronic device from the virtual group contact list of the first mobile electronic device, and go to Step 3214.

Step 3214: End.

The contact list sharing method shown in FIG. 20 will be explained with the aid of mobile electronic devices shown in FIG. 19. Note that the first mobile electronic device mentioned in the steps of FIG. 20 may indicate the mobile electronic device 3102 shown in FIG. 19, and the at least one second mobile electronic device mentioned in the steps shown in FIG. 20 may indicate at least one of the mobile electronic devices 3104 and 3106.

In Step 3202, when the user of the mobile electronic device 3102 intends to contact the wanted user, the wireless communication protocol installed on the mobile electronic device 3102 is activated. Note that Step 3202 may be optional if the wireless communication protocol has been activated before the user of the mobile electronic device 3102 intends to contact the wanted user.

In Step 3204, the mobile electronic device 3102 confirms whether there is at least one mobile electronic device using the same wireless communication protocol as the mobile electronic device 3102 utilizes, by receiving a response signal in response to the polling signal. If the mobile electronic device 3102 receives at least one response signal, it indicates the fact that there is at least one other mobile electronic device falling within an available range/distance of communication of/from the mobile electronic device 3102 and utilizing the same wireless communication protocol as well.

As can be observed in FIG. 19, both the mobile electronic devices 3104 and 3106 will be processed in Step 3206 by the mobile electronic device 3102 since the mobile electronic devices 3104 and 3106 respond with response signals RES1 and RES2 respectively, and since the mobile electronic device 3102 receives both the response signals RES1 and RES2. Both the mobile electronic device 3108 and 3110 will not be processed in Step 3206 by mobile electronic device 3102 since the wireless communication protocol utilized by the mobile electronic device 3102 is not utilized on either one of the mobile electronic devices 3108 and 3110.

In Step 3206, the responding mobile electronic devices 3104 and 3106 are further checked to confirm whether the mobile electronic device 3102 is able to recognize the mobile electronic devices 3104 and 3106, for security issues. The condition of checking recognition may include check whether identities of the checked mobile electronic devices are recorded in the contact list of the mobile electronic device 3102. Both the mobile electronic devices 3104 and 3106 are assumed to be recognizable for the mobile electronic device 3102. Therefore, a virtual group 3120 including the mobile electronic devices 3102, 3104 and 3106 can be temporarily formed under mutual recognition. Furthermore, each of the mobile electronic devices 3102, 3104, and 3106 may keep a respective right of quitting the virtual group 3120 in some embodiments of the present invention.

In Step 3208, since members of the virtual group 3120 are authorized to access respective contact lists with each other, a virtual group contact list 3150 is temporarily generated in the mobile electronic device 3102 by merging contact information of the contact lists 3132, 3134 and 3136, where merging the contact information of the contact lists 3132, 3134 and 3136 may indicate transmitting contents of the contact lists 3132, 3134 and 3136 to the first mobile electronic device 3102. If the contact information of the wanted user happens to be previously stored in anyone of the contact lists 3134 and 3136, the mobile electronic device 3102 is capable of accessing the contact information of the wanted user via the virtual group contact list 3150 so that the user of the mobile electronic device 3102 is able to contact the wanted user by using the contact information in the virtual group contact list 3150.

In Step 3210, no matter whether the mobile electronic device 3102 finds the contact information of the wanted user in the virtual group contact list 3150 or not, the mobile electronic device 3102 waits for a stop instruction based on the wireless communication protocol to cancel or reform the virtual group 3120 if anyone of the mobile electronic devices 3102, 3104 and 3106 triggers the stop instruction. The stop instruction may be triggered by the mobile electronic device 3102 after accessing or utilizing the contact information of the wanted user, when at least one of the mobile electronic devices 3104 and 3106 is moved away and does not respond to the mobile electronic device 3102 for a predetermined period of time, i.e. located outside the proximity of the mobile electronic device 3102, or when a signal magnitude of communication between the mobile electronic devices is weaker than a predetermined magnitude. The stop instruction may also be triggered by anyone of the mobile electronic devices 3102, 3104 and 3106 when the user of anyone of the mobile electronic devices 3102 or 3104 or 3106 intends to stop sharing his/her contact list.

In Step 3212, after the stop instruction is triggered, a contact list is removed from the virtual group contact list 3150 and a corresponding mobile electronic device is removed from the virtual group 3120, in correspondence with the stop instruction. For example, if the mobile electronic device 3104 triggers the stop instruction, the mobile electronic device 3102 will remove the contact list 3134 from the virtual group contact list 3150, and the mobile electronic device 3104 is also removed from the virtual group 3120. If the mobile electronic device 3102 triggers the stop instruction, the mobile electronic device 3102 will directly remove the virtual group contact list 3150 and the virtual group 3120 since the mobile electronic device 3102 is founder of both the virtual group contact list 3150 and the virtual group 3120. Note that Step 3212 is optional in other embodiments of the present invention. It indicates that the mobile electronic device 3102 may still hold contact information from either one of the mobile electronic devices 3104 and 3106 even if the stop instruction is received.

In one embodiment of the present invention, the mobile electronic devices 3102, 3104 and 3106 may assign a predetermined time, a predetermined location, or both, for completing mutual recognition performed in Step 3202, Step 3204, and Step 3206, where the predetermined time or the predetermined location may be set or updated by the mobile electronic device 3102 in advance. And the sharing of contact information is only granted during predetermined time, for the purpose of improving security.

Note that there may also be a virtual group contact list in the mobile electronic devices 3104 and 3106, and operations of the virtual group contact list in the mobile electronic devices 3104 and 3106 are the same as the virtual group contact list 3150. For example, a virtual group contact list of the mobile electronic device 3104 may include the contact list 3132 transmitted from the first mobile electronic device 3102.

In a second embodiment of the present invention, members of the virtual group 3120 can be selectively authorized by the mobile electronic device 3102 even if all the members in virtual group 3120 have the wireless communication protocol activated. Please refer to FIG. 21, which illustrates the contact list sharing method according to the second embodiment of the present invention. The contact list sharing method includes steps as follows:

Step 3222: Broadcast a polling signal based on a wireless communication protocol by a first mobile electronic device, and go to Step 3224.

Step 3224: Confirm, by the first mobile electronic device, whether there is a second mobile electronic device using the wireless communication protocol by receiving a response signal, which is in response to the polling signal, from the second mobile electronic device; when there is the at least one second mobile electronic device using the wireless communication protocol is confirmed, go to Step 3225; else, go to Step 3234.

Step 3225: Select at least one from the at least one second mobile electronic device by the first mobile electronic device to issue a request to access to the contact list of the at least one second mobile electronic device, and go to Step 3226.

Step 3226: Receive the authorization by the first mobile electronic device from the at least one second mobile electronic device, which has received and approved the authorization from the first mobile electronic device, for authorizing access to the contact list of the at least one second mobile electronic device, and go to Step 3228.

Step 3228: Merge a contact list of the at least one second mobile electronic device into a virtual group contact list of the first mobile electronic device, and go to Step 3230.

Step 3230: Wait, by the first mobile electronic device, for a stop instruction of the wireless communication protocol; if the stop instruction is received, go to Step 3232; else, go to Step 3234.

Step 3232: Remove the contact list of the second mobile electronic device from the virtual group contact list of the first mobile electronic device, and go to Step 3234.

Step 3234: End.

Figure 21:
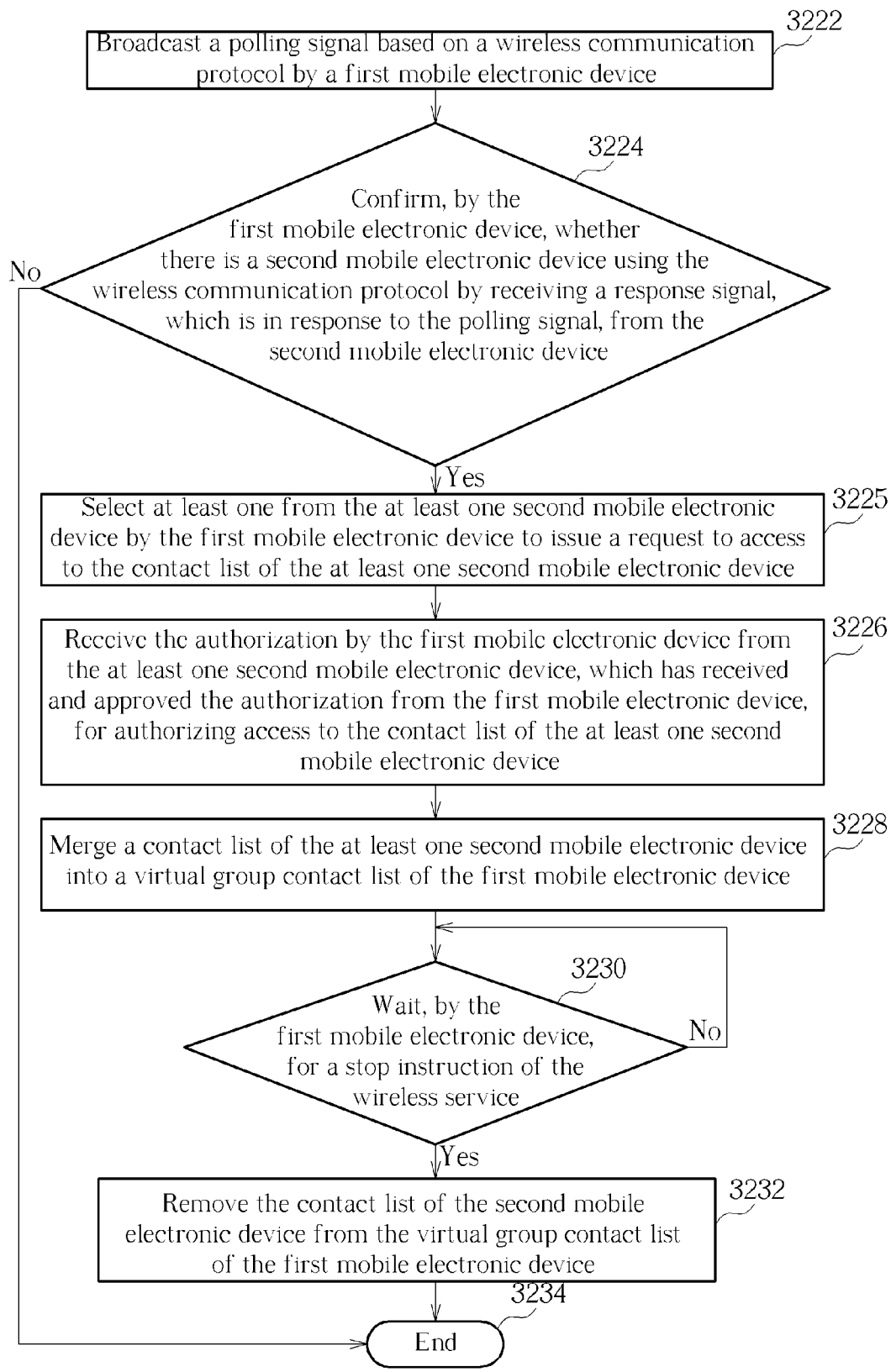

The primary difference between the embodiments shown in FIG. 20 and FIG. 21 lies in authorization, where the mobile electronic device 3102 may select only one of the mobile electronic devices 3104 and 3106 to request for authorization in transmitting contact lists, instead of choosing all of the identified mobile electronic devices 3104 and 3106 for sharing contact information in FIG. 20.

Note that Step 3232 is also optional in other embodiments of the present invention. It indicates that the mobile electronic device 3102 may still hold contact information from either one of the mobile electronic devices 3104 and 3106 even if the stop instruction is received.

In one embodiment of the present invention, the mobile electronic devices 3102, 3104 and 3106 may assign a predetermined time, a predetermined location, or both, for completing authorization performed in Step 3222, Step 3224, Step 3225 and Step 3226. And the sharing of contact information is only granted during predetermined time, for the purpose of improving security.

Note that embodiments formed by adding the above-mentioned limitations in the steps shown in FIGS. 20-21 or by reasonable combinations or permutations of the steps shown in FIGS. 20-21 should also be regarded as embodiments of the present invention.

In other embodiments of the present invention related to as disclosed in FIG. 21, the mobile electronic device 3102 may select part of the second mobile electronic devices to request for authorization instead of selecting merely one.

A non-transitory machine readable media may be utilized for storing computer codes programmed according to the contact list sharing method of the present invention, such as the contact list sharing method disclosed in FIGS. 19-21, so that the stored computer codes may be run by a processor of any kind of mobile electronic device to fulfill the purpose of the present invention. In one embodiment of the present invention, the non-transitory machine readable media comprises a first computer code, a second computer code, and a third computer code. When executed by a processor of a first mobile electronic device, the first computer code is configured to broadcast a polling signal based on a wireless communication protocol. When executed by the processor of the first mobile electronic device, the second computer code confirms, by the first mobile electronic device, whether there is a second mobile electronic device using the wireless communication protocol by receiving a response signal, which is in response to the polling signal, from the second mobile electronic device. When executed by the processor of the first mobile electronic device, the third computer code is configured to merge a contact list of the second mobile electronic device into a virtual group contact list of the first mobile electronic device when the first mobile electronic device receives the response signal.

With the aid of the contact list sharing method disclosed in FIGS. 19-21, a user of a mobile electronic device is able to contact a wanted user whose contact information does not be stored in a contact list of the mobile electronic device if the contact information of the wanted user happens to be stored in another mobile electronic device responds to the mobile electronic device and utilizes a same wireless communication protocol as the mobile electronic device utilizes.

(3-A) Virtual Playlist Sharing/Media File Sharing

Figure 22:
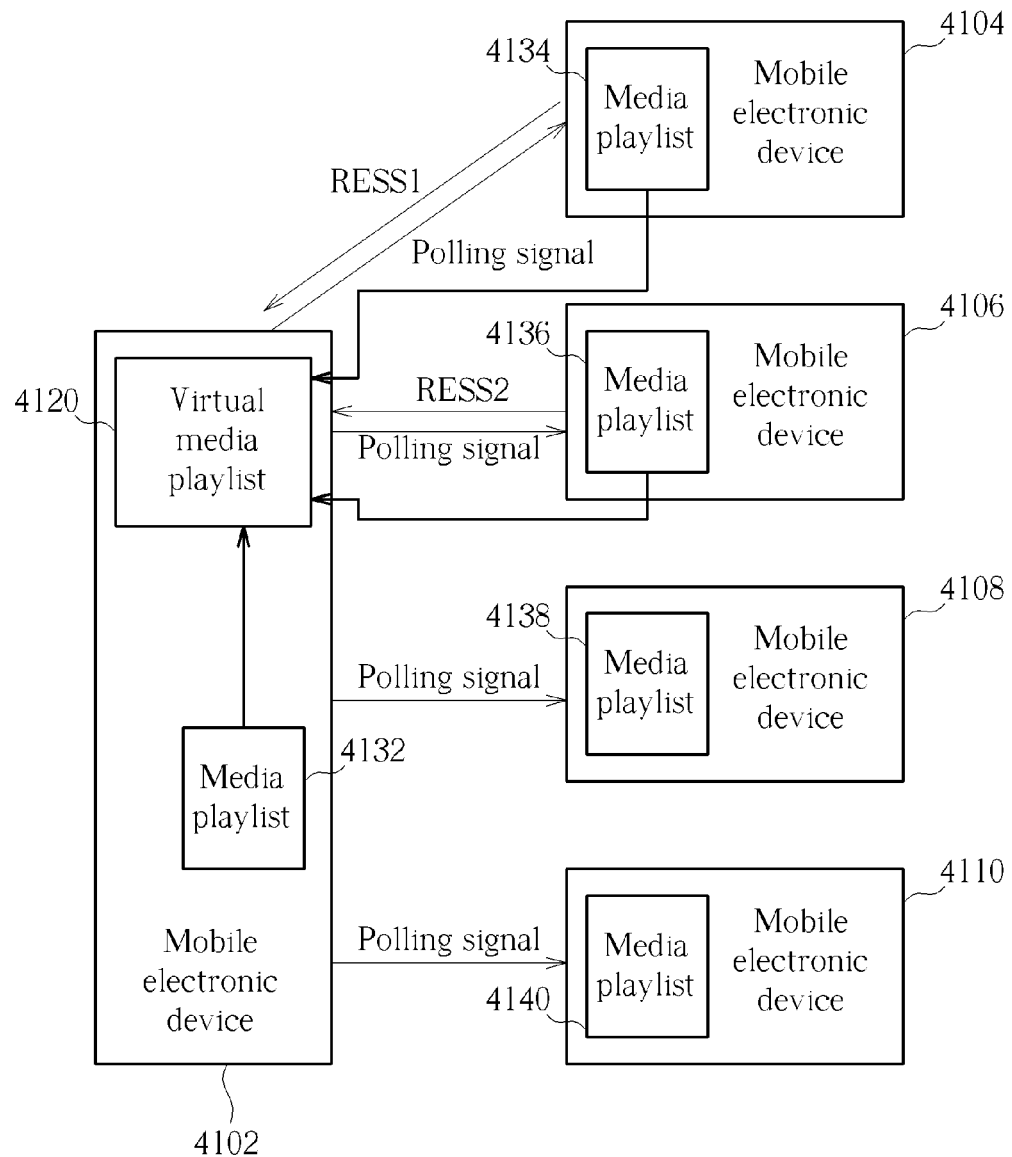
FIGS. 22 and 24 illustrate a schematic diagram for illustrating how the media sharing method works on a mobile electronic device according to some embodiments of the present invention.

Please refer to FIG. 22, which illustrates a schematic diagram for illustrating how the media sharing method works on a mobile electronic device. There are a plurality of mobile electronic devices 4102, 4104, 4106, 4108 and 4110 for explaining the media sharing method of the present invention, where the mobile electronic devices 4102, 4104, 4106, 4108 and 4110 respectively have media playlists 4132, 4134, 4136, 4138 and 4140. The mobile electronic device 4102 is configured to broadcast a polling signal based on a wireless communication protocol, such as the above-mentioned wireless communication protocols. The mobile electronic devices 4104, 4106, 4108, and 4110 are assumed to receive the polling signal, however, only the mobile electronic devices 4104 and 4106 are assumed to utilize the same wireless communication protocol that the mobile electronic device 4102 utilizes. Therefore, each of the mobile electronic devices 4104 and 4106 responds the mobile electronic device 4102 with a response signal RESS1 or RESS2.

In embodiments of the present invention, since the wireless communication protocol is based on near field communication, some other mobile electronic devices utilizing the wireless communication protocol and falling outside of the capability of the mobile electronic device 4102 in broadcasting the polling signal will not receive nor respond to the polling signal.

After receiving the response signals RESS1 and RESS2, the mobile electronic device 4102 is able to confirm existence of both the mobile electronic devices 4104 and 4106.

It is assumed that a user of the mobile electronic device 4102 intends to access media files from at least one of the mobile electronic devices 4104, 4106, 4108 and 4110. With the aid of the disclosed media sharing method, a virtual media playlist can be generated between a group of mobile electronic devices capable of responding to each other, and each member of the group of mobile electronic devices is capable of accessing media files of other members by referencing the virtual media playlist.

Figure 23:
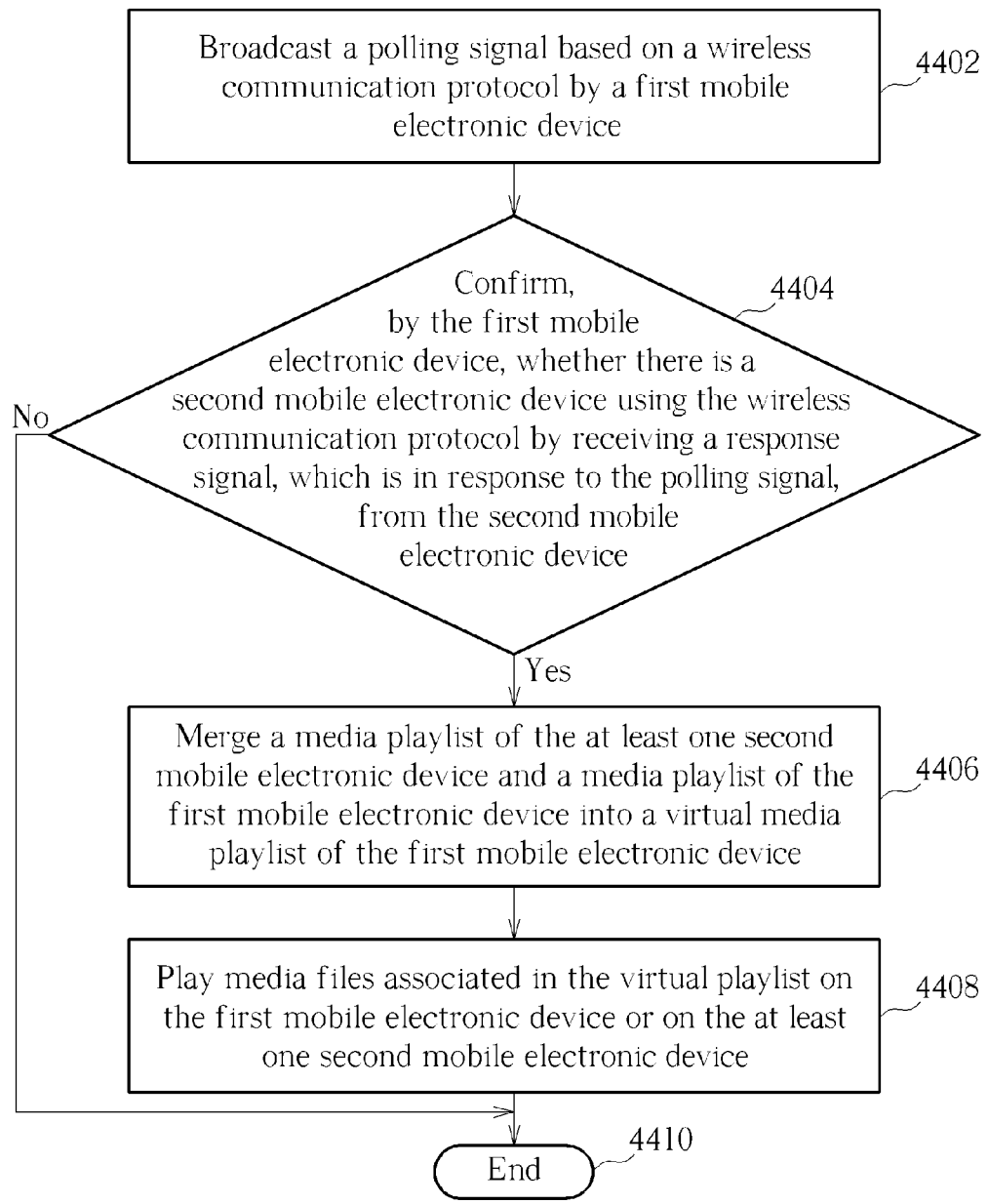
FIG. 23 illustrates the media sharing method according to one embodiment of the present invention.

Please refer to FIG. 23, which illustrates the media sharing method according to one embodiment of the present invention. FIG. 23 includes steps as follows:

Step 4402: Broadcast a polling signal based on a wireless communication protocol by a first mobile electronic device.

Step 4404: Confirm, by the first mobile electronic device, whether there is a second mobile electronic device using the wireless communication protocol by receiving a response signal, which is in response to the polling signal, from the second mobile electronic device; when there is the at least one second mobile electronic device using the wireless communication protocol is confirmed, go to Step 4406; else, go to Step 412.

Step 4406: Merge a media playlist of the at least one second mobile electronic device and a media playlist of the first mobile electronic device into a virtual media playlist of the first mobile electronic device, and go to Step 4408.

Step 4408: Play media files associated in the virtual playlist on the first mobile electronic device or on the at least one second mobile electronic device, and go to Step 4410.

Step 4410: End.

The media sharing method shown in FIG. 23 will be explained with the aid of mobile electronic devices shown in FIG. 22. Note that the first mobile electronic device mentioned in the steps of FIG. 23 may indicate the mobile electronic device 4102 shown in FIG. 22, and the at least one second mobile electronic device mentioned in the steps shown in FIG. 23 may indicate at least one of the mobile electronic devices 4104, 4106, 4108 and 4110.

In Step 4402, when the user of the mobile electronic device 4102 intends to access media files from other nearby mobile electronic devices, the wireless communication protocol installed on the mobile electronic device 4102 is activated. The mobile electronic device 4102 broadcasts a polling signal. Then in Step 4404, the mobile electronic device 4102 confirms whether there is at least one mobile electronic device issuing response signals in response to the polling signal and utilizing the same wireless communication protocol as the mobile electronic device 4102 utilizes. According to the above-mentioned assumption, both the mobile electronic devices 4104 and 4106 will be confirmed by the mobile electronic device 4102. Note that in the embodiment shown in FIG. 23, if the mobile electronic device 4102 has the wireless communication protocol activated, it means the mobile electronic device 4102 has authorized the mobile electronic devices 4104 and 4106 to access respective multimedia files/lists with each other. As for the mobile electronic devices 4108 and 4110, although they receive the polling signal, since the wireless communication protocol is not utilized on both the mobile electronic devices 4108 and 4110, both the mobile electronic devices 4108 and 4110 will not be granted to access multimedia files/lists with the mobile electronic device 4102, 4104, and 4106.

Therefore, a virtual media playlist 4120 including playlists 4132, 4134, and 4136 respectively transmitted by the mobile electronic devices 4102, 4104 and 4106 can be generated on the mobile electronic device 4102 by merging the playlists 4132, 4134, and 4136, as indicated by Step 4406.

In Step 4408, since the virtual media playlist 4120 is generated on the mobile electronic device 4102, the mobile electronic device 4102 is capable of tracing media files listed by the virtual media playlist 4120. For example, when the user of the mobile electronic device 4102 sees an index of a preferred media file listed on the virtual media playlist 4120, where the preferred media file substantially exists in the mobile electronic device 4104 now, the user is allowed to issue an instruction via the virtual media playlist to track and play the preferred media file. Note that the preferred media file may include audio files/streams, video files/streams, and/or even digital photos.

In one embodiment of the present invention, the virtual media playlist may include a plurality of multimedia categories of media files. The user of the mobile electronic device 4102 is able to pick one preferred category of multimedia files for sharing, and so do users of the mobile electronic devices 4104 and 4106.

The preferred media file can be played, i.e., accessed, on either one of the mobile electronic device 4102 or the mobile electronic device 4104. If the preferred media file is to be played on the mobile electronic device 4102, the preferred media file will be transmitted from the mobile electronic device 4104 to the mobile electronic device 4102 in advance. Note that the transmission of the preferred media file from the mobile electronic device 4104 to the mobile electronic device 4102 can be implemented by downloading, caching, or copying. Else, if the preferred media file is to be played on the mobile electronic device 4104, the transmission of the preferred media file from the mobile electronic device 4104 to the mobile electronic device 4102 can be neglected.

In Step 4410, when a media file stored in one of the at least one nearby mobile electronic device is browsed on the virtual playlist, the media file may be downloaded, cached, or copied from the at least one nearby mobile electronic device to be played on the first mobile electronic device, or may be directly played by the nearby mobile electronic device storing said media file.

Figure 24:
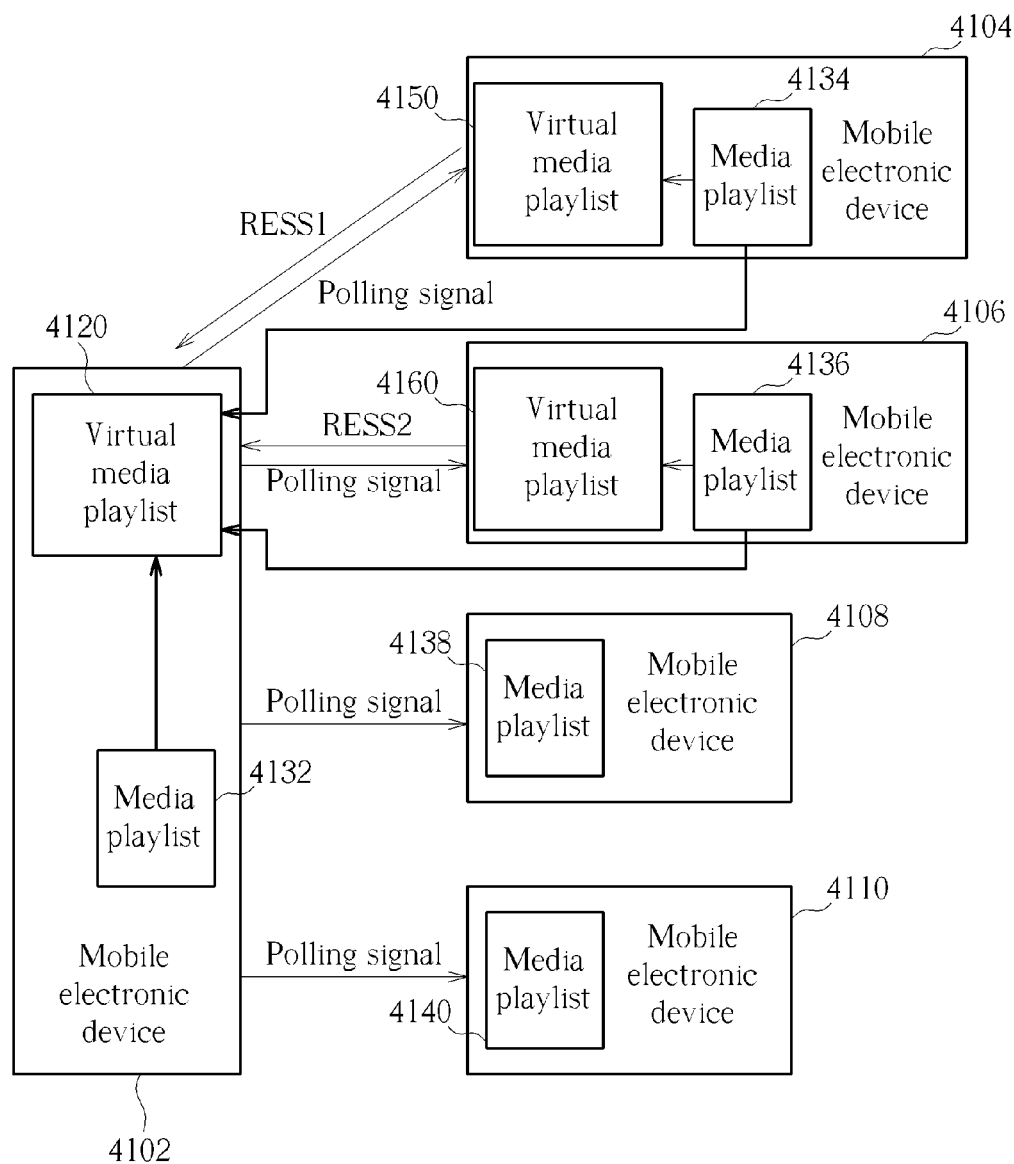

If a user of any one of the mobile electronic devices 4104 and 4106 intends to access a media file stored in the mobile electronic device 4102, the user is also able to access the media file via a virtual media playlist generated on his mobile electronic device, similar as the user of the mobile electronic device 4102 is allowed to. Please refer to FIG. 24, which illustrates how the mobile electronic device 4104 or 4106 works when either one the mobile electronic devices 4104 and 4106 may also generate a virtual media playlist itself according to one embodiment of the present invention. As shown in FIG. 24, the mobile media electronic device 4104 may update its own virtual media playlist 4150 by merging original contents of the virtual media playlist 4150, which may include contents of the media playlist 4134, with contents of the media playlist 4132 and/or the media playlist 4136; similarly, the mobile media electronic device 4106 may update its own virtual media playlist 4160 by merging original contents of the virtual media playlist 4160, which may include contents of the media playlist 4136, with contents of the media playlist 4132 and/or the media playlist 4134. Therefore, when the user of the mobile electronic device 4104 intends to access a media file registered in the media playlist 4132 or in the media playlist 4136, besides accessing the virtual media playlist 4120 or playing the media file on the mobile electronic device 4102 as mentioned above, he or she may also download the media file from the mobile electronic device 4102 or 4106 to play said media file on the mobile electronic device 4104 by using the virtual media playlist 4150, where simultaneous downloading and playing on the mobile electronic device 4104 may also be allowed according to one embodiment of the present invention; similarly, when the user of the mobile electronic device 4106 intends to access a media file registered in the media playlist 4132 or in the media playlist 4134, besides accessing the virtual media playlist 4120 as mentioned above, he or she may also download the media file from the mobile electronic device 4102 or 4104 to play said media file on the mobile electronic device 4106 by using the virtual media playlist 4160, where simultaneous downloading and playing on the mobile electronic device 4106 may also be allowed according to one embodiment of the present invention. How the virtual media playlist 4150 is utilized on the mobile electronic device 4104 or how the virtual media playlist 4160 is utilized on the mobile electronic device 4106 is similar as how the virtual media playlist 4120 is utilized on the mobile electronic device 4102 as mentioned above.

With the aid of the media sharing method shown in FIGS. 22-24, mobile electronic devices capable of responding to each other and utilizing a same wireless communication protocol are capable of sharing media playlists and corresponding media files with each other. Note that the wireless communication protocol is preferably suitable for peer-to-peer wireless communication technologies, or near field communication.

A non-transitory machine readable media may be utilized for storing computer codes programmed according to the media sharing method of the present invention, such as the media sharing method disclosed in FIGS. 22-24, so that the stored computer codes may be run by a processor of any kind of mobile electronic device to fulfill the purpose of the present invention.

(9) Handshaking and/or Contact Contents Sharing

The steps shown in FIG. 1 represent one handshaking technique according to one embodiment of the present invention. However, there is still one more embodiment disclosing another handshaking technique of the present invention for providing wireless communication protocol. The provided wireless communication protocol may be based on a wireless communication protocol, such as near field communication (NFC) protocols, Wi-Fi, or Bluetooth.

Figure 25:
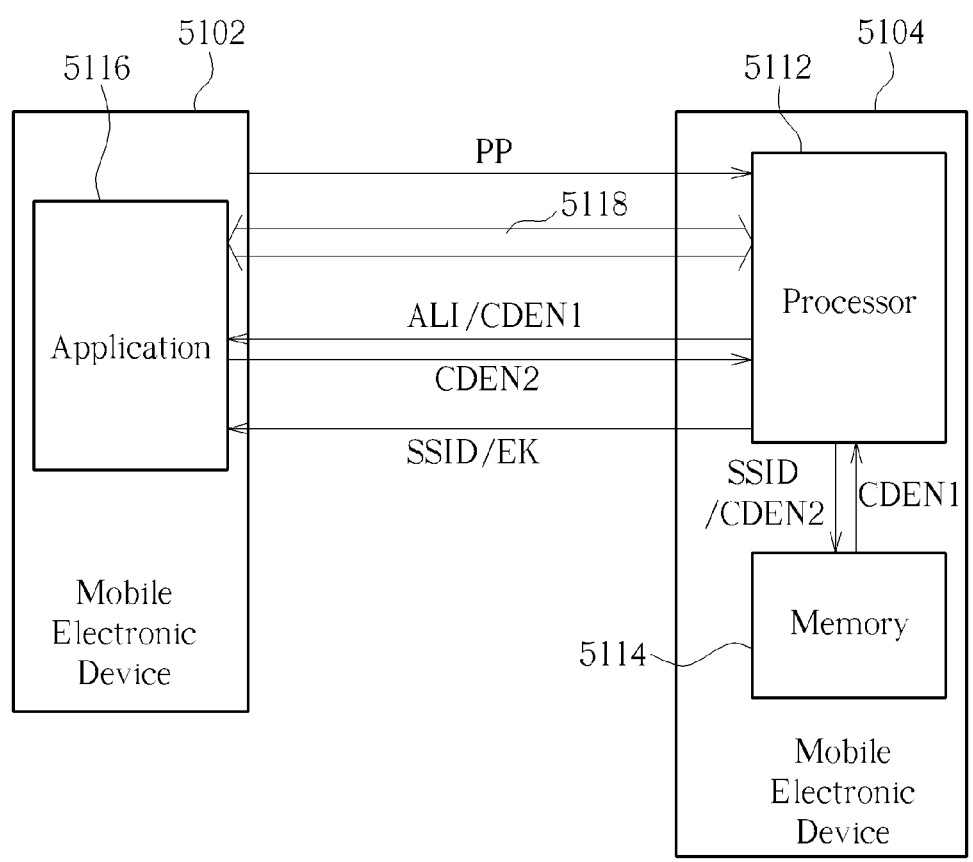
FIG. 25 illustrates how a handshaking technique for establishing an application-related communication between mobile electronic devices works according to one embodiment of the present invention.

Please refer to FIG. 25, which illustrates how a handshaking technique for establishing an application-related communication between mobile electronic devices works according to one embodiment of the present invention. As shown in FIG. 25, a mobile electronic device 5102 acts as a host to broadcast a phrase packet PP for polling, and is installed with an application 5116; and a mobile electronic device 5104 receives the phrase packet PP from the mobile electronic device 5102 and acts as a client. The mobile electronic device 5104 includes a processor 5112 and a memory 5114. The primary purpose illustrated by FIG. 25 is to demonstrate how to establish an application-related communication path 5118 between the mobile electronic devices 5102 and 5104 and related to the application 5116.

Figure 26:
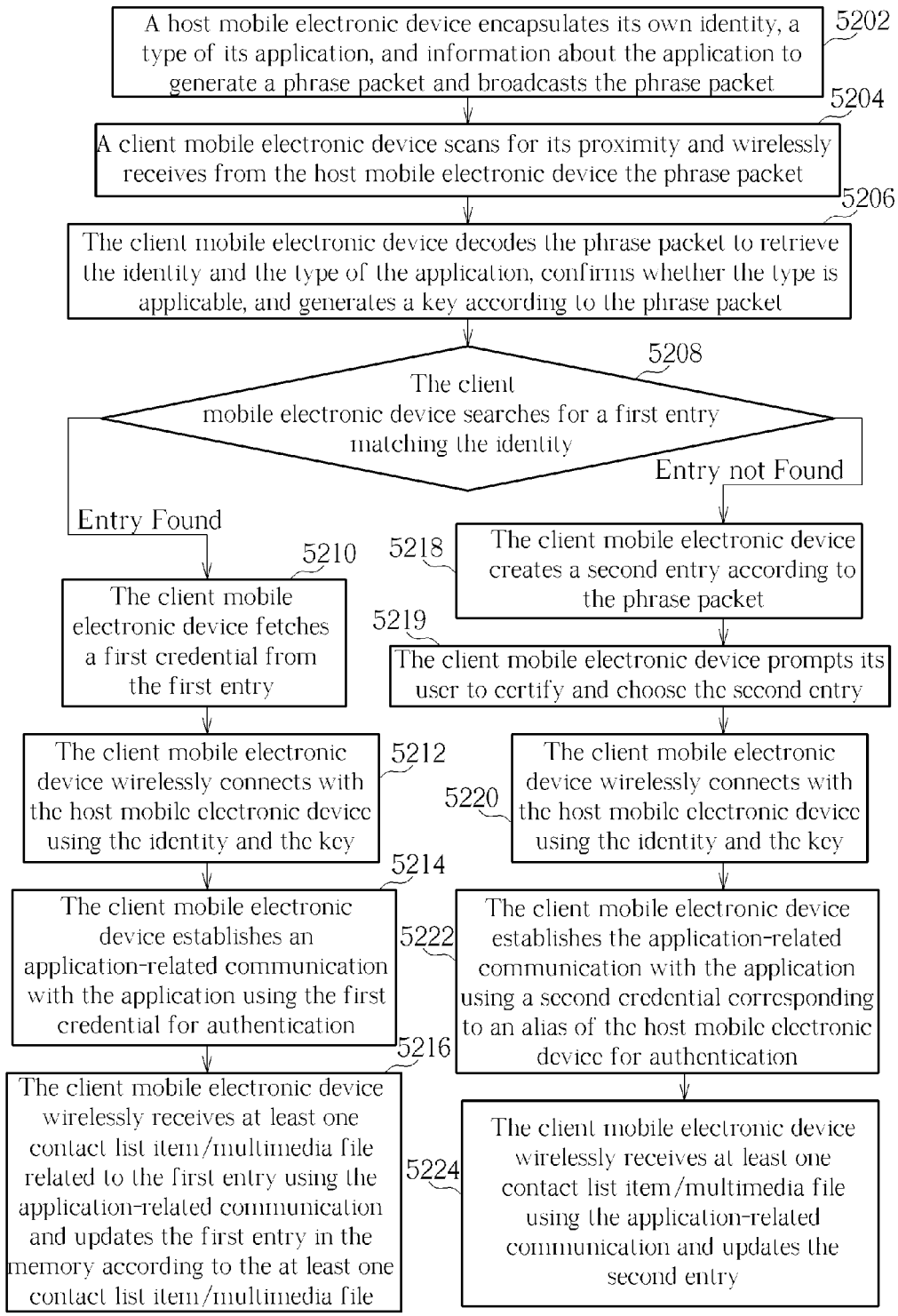
FIG. 26 illustrates a method of establishing application-related communication between mobile electronic devices according to one embodiment of the present invention as illustrated in FIG. 25.

Please refer to FIG. 26, which illustrates a method of establishing application-related communication between mobile electronic devices, i.e. handshaking, according to one embodiment of the present invention as illustrated in FIG. 25. As shown in FIG. 26, the method includes steps as the following:

Step 5202: The mobile electronic device 5102 encapsulates an identity SSID of the mobile electronic device 5102, a type of the application 5116, and information about the application 5116 to generate the phrase packet PP using a format regulated by a wireless communication protocol utilized by the mobile electronic device 5102 and broadcasts the phrase packet PP.

Step 5204: The mobile electronic device 5104 scans for mobile electronic devices in its proximity and wirelessly receives from the mobile electronic device 5102 the phrase packet PP after finding the mobile electronic device 5102.

Step 5206: The mobile electronic device 5104 decodes the phrase packet PP to retrieve the identity SSID and the type of the application 5516, confirms whether the type of the application 5516 is applicable for the mobile electronic device 5104, and generates a key EK according to the phrase packet PP when the type of the application 5116 is confirmed to be applicable for the mobile electronic device 5104.

Step 5208: The mobile electronic device 5104 searches a plurality of entries stored in the memory 5114 for a first entry matching the identity SSID; if the first entry is found in the memory 5114, go to Step 5210; else, if the first entry is not found, go to Step 5218.

Step 5210: The mobile electronic device 5104 fetches a first credential CDEN1 from the first entry.

Step 5212: The mobile electronic device 5104 wirelessly connects with the mobile electronic device 5102 using the identity SSID and the key EK.

Step 5214: The mobile electronic device 5104 establishes the application-related communication 5118 with the application 5116 using the first credential CDEN1 for authentication.

Step 5216: The mobile electronic device 5104 wirelessly receives at least one contact list item/multimedia file related to the first entry using the application-related communication 5118 and updates the first entry in the memory 5114 according to the at least one contact list item/multimedia file.

Step 5218: The mobile electronic device 5104 creates a second entry in the memory 5114 according to the phrase packet PP.

Step 5219: The mobile electronic device 5104 prompts its user to certify and choose the second entry, and go to Step 5220 if the second entry is certified and chosen by the user of the second mobile electronic device 5104.

Step 5220: The mobile electronic device 5104 wirelessly connects with the mobile electronic device 5102 using the identity SSID and the key EK.

Step 5222: The mobile electronic device 5104 establishes the application-related communication 5118 with the application 5116 using a second credential CDEN2 corresponding to an alias ALI of the mobile electronic device 5102 generated according to the phrase packet PP for authentication.

Step 5224: The mobile electronic device 5104 wirelessly receives at least one contact list item/multimedia file related to the second entry using the application-related communication 5118 and updates the second entry in the memory 5114 according to the at least one contact list item/multimedia file.

Details about the steps shown in FIG. 26 will be explained in the following paragraphs. Note that components and functions of the components of the mobile electronic devices 5102 and 5104 may be the same in some embodiments of the present invention, although components of the mobile electronic device 5102 are ignored in FIG. 25 for brevity.

In Step 5202, when a user of the mobile electronic device 5102 intends to communicate with another mobile electronic device using the application 5116, the mobile electronic device 5102 is configured to encapsulate at least its own identity SSID and information about the application 5116 in the phrase packet PP, which fits a specific form regulated by the wireless communication protocol. A type of the application 5116 may also be encapsulated in the phrase packet PP while generating the phrase packet PP. For example, the phrase packet PP may be in the form of {SSID, type of the application 5116, information of the application 5116 according to one embodiment of the present invention. In one embodiment of the present invention, the type of the application 5516 may be embedded in a prototype of the phrase packet PP in advance, i.e. as a default template of any phrase packet to be generated by the mobile electronic device 5102. The type of the application 5116 may be related to an album, a camera, a video, or other applications that can be installed on conventional mobile electronic devices.

In Step 5204, the mobile electronic device 5104 scans for mobile electronic devices in its proximity. As a result, the mobile electronic device 5104 wirelessly receives the phrase packet PP from the mobile electronic device 5102 by scanning its proximity when the wireless communication protocol is utilized by both the mobile electronic devices 5102 and 5104. Then, in Step 5206, the processor 5112 is configured to decode the phrase packet PP to retrieve at least the identity SSID and the type of the application 5116, or further the required information about the application 5116 by decoding the phrase packet PP when the format of the phrase packet PP fits a format regulated by the wireless communication protocol utilized by the mobile electronic device 5102. Applicability of the type of the application 5116 for the mobile electronic device 5104 is also confirmed by the processor 5112 along with the decoding. The decoding of Step 5206 may lead to different results. For example, if the type of the application is not applicable for the mobile electronic device 5104, the processor 5112 may not be able to decode the information about the application 5116. Else, when the type of the application 5116 is applicable for the mobile electronic device 5104, the processor 5112 is capable of decoding the information about the application 5116 and generating a key EK using the phrase packet PP as an index in a key-generating function defined by the wireless communication protocol. That is, the mobile electronic device 5102 may also utilize the same key-generating function to derive the same key EK for future authentication.

In one embodiment, the processor 5112 may be further configured to verify availability of the identity SSID to check whether the identity SSID matches regulations of the wireless communication protocol in Step 5206.

In Step 5208, the processor 5112 uses the identity SSID as an index to search a plurality of entries previously stored in the memory 5114 for a first entry matching the identity SSID. Each of the plurality of entries may be stored in a lookup table of the memory 5114, and was established at a previous time when a corresponding mobile electronic device wirelessly connected with the mobile electronic device 5104.

If the first entry is found in the memory 5114 in Step 5208, it indicates the mobile electronic device 5102 wirelessly connected to the mobile electronic device 5104 at a previous time. Then in Step 5210, the processor 5112 fetches a credential CDEN1 from the first entry, where the credential CDEN1 was established along with the first entry by the application 5116 at a previous time when the mobile electronic device 5104 wirelessly connected with the application 5116.

Note that there are two levels of connections between the mobile electronic devices 5102 and 5104. At a first level, the mobile electronic device 5104 requires at least the identity SSID and the key EK for authentication, where the first level may be regarded as a firewall for the mobile electronic device 5102 under the wireless communication protocol. At a second level, the mobile electronic device 5104 requires at least a credential previously issued by the mobile electronic device 5102 or an alias of the mobile electronic device 5102 for authentication, where the second level acts as a firewall for the application 5116.

In Step 5212, the mobile electronic device 5104 uses the identity SSID and the key EK to wirelessly connect to the mobile electronic device 5102 for authentication under the first level connection.

In Step 5214, the mobile electronic device 5104 provides the first credential CDEN1 to the application 5116 for authentication under the second level so that the application 5116 will be aware that the mobile electronic device 5104 is a trustable client for itself; then the mobile electronic device 5104 will be granted by the application to establish an application-related communication 5118 between the mobile electronic device 5104 and the application 5116.

At last, since the application-related communication 5118 is established, data or information related to the application 5116 may be exchangeable between the application 5116 and the mobile electronic device 5104 via the application-related communication 5118, and the first entry in the memory 5114 may be updated according to the exchangeable data or information. In one embodiment of the present invention, the application 5116 is a communication application, therefore the exchangeable data or information may be contents associated with the communication application and related to the first entry, where the contents may include at least one contact item or multimedia file, the at least one contact item may include contexts such as names, addresses, telephone numbers, personal information, or private messages, and the at least one multimedia file may include pictures, audios, videos, or other types of media items.

If the first entry is not found in the memory 5114 in Step 5208, i.e. when no entry matches the identity SSID, it indicates the mobile electronic device 5102 never wirelessly connects to the mobile electronic device 5104. Then in Step 5218, the processor 5112 creates a second entry for the identity SSID in the memory 5114.

In Step 5219, the mobile electronic device 5104 prompts its user to certify the second entry by displaying information of the second entry in an interactive manner, such as a name or a picture of the user of the mobile electronic device 5102, where the name or the picture is previously carried in the information related to the application 5116 encapsulated in the phrase packet PP. The user of the mobile electronic device 5104 may recognize the information related to the second entry and give an external input to the mobile electronic device 5104 for certification. Whether the second entry is certified by the user of the mobile electronic device 5104 is then updated in the memory 5114 after receiving the external input.

In one embodiment of the present invention, the mobile electronic device 5104 may also prompt its user to choose one of a plurality of entries certified by said user, inclusive of the second entry if the second entry has been certified. For clear explanation, assume that the second entry is chosen by said user in Step 5219. However, if a certified entry other than the second entry is chosen in Step 5219, the certified entry will be retreated as the second entry in Step 5220, Step 5222, and Step 5224.

After performing Step 5218, the processor 5112 is also configured to generate the alias ALI of the mobile electronic device 5102 using contents of the phrase packet PP as an index to a string generator regulated by the wireless communication protocol. Similar as the condition of generating the key EK, the mobile electronic device 5102 may also use the string generator and contents of the phrase packet PP to generate the alias ALI for future authentication.

Step 5220 is the same as Step 5212 for authentication under the first level of connection.

In Step 5222, the mobile electronic device 5104 uses the alias ALI for authentication under the second level of connection. After receiving the alias ALI, the application 5116 will be aware that the mobile electronic device 5104 is a new client. The application 5116 then generates a second credential CDEN2 for the mobile electronic device 5104 and returns the second credential CDEN2 to the mobile electronic device 5104 for future authentication. That is, the mobile electronic device 5104 is granted to use the second credential CDEN2 to establish the application-related communication 5118 with the application 5116.

In some embodiments of the present invention, the processor 5112 is further configured to update the second entry with the second credential CDEN2 in the memory 5114 so that the mobile electronic device 5104 is capable of directly establishing the application-related communication 5119 with the application 5116 without requesting the second credential once again, after passing authentication under the first level of connection.

Therefore in Step 5224, similar as Step 5216, data or information related to the application 5116 may be exchangeable between the application 5116 and the mobile electronic device 5104 via the application-related communication 5118, and the second entry in the memory 5114 may be updated according to the exchangeable data or information. In one embodiment of the present invention, the application 5116 is a communication application, therefore the exchangeable data or information may be contents associated with the communication application and related to the second entry, where the contents may include at least one contact item or multimedia file, the at least one contact item may include contexts such as names, addresses, telephone numbers, personal information, or private messages, and the at least one multimedia file may include pictures, audios, videos, or other types of media items.

A non-transitory machine readable media may be utilized for storing computer codes programmed according to the method of establishing application-related communication of the present invention, such as the method of establishing application-related communication disclosed in FIGS. 25-26, so that the stored computer codes may be run by a processor of any kind of mobile electronic device to fulfill the purpose of the present invention.

With the aid of the disclosure in FIGS. 25-26, when a host mobile electronic device and a client mobile electronic device connect to each other for at least a second time, the client mobile electronic device can be relieved from the burden of requesting a required credential repeatedly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A media sharing method utilizing a wireless communication protocol, comprising:
    a first mobile electronic device scanning a photo filmed by itself or a video taped by itself, and detecting whether there is at least one facial pattern on the photo or the video;
    the first mobile electronic device broadcasting a polling signal based on a wireless communication protocol;
    the first mobile electronic device confiming whether there is a second mobile electronic device utilizing the wireless communication protocol, wherein the confirmation is performed by receiving a response signal sent by the second mobile electronic device in response to the polling signal;
    comparing at least one facial pattern characteristic on the photo or the video with at least one facial pattern characteristic stored on the second mobile electronic device and/or with at least one facial pattern characteristic related to a user of the second mobile electronic device stored in the first mobile electronic device when the first mobile electronic device receives the response signal and when there is at least one facial pattern detected on the photo or the video; and
    the first mobile electronic device sending the photo or the video to the second mobile electronic device when a result of comparing the at least one facial pattern characteristic on the photo or the video with the at least one facial pattern characteristic stored on the second mobile electronic device and/or with the at least one facial pattern characteristic related to the user of the second mobile electronic device stored in the first mobile electronic device is positive about matching.

* * * * *

UNITED STATES PATENT AND TRADEMARK OFFICE
CERTIFICATE OF CORRECTION

| | | |
|---|---|---|
| PATENT NO. | : 9,143,889 B2 | Page 1 of 1 |
| APPLICATION NO. | : 13/541770 | |
| DATED | : September 22, 2015 | |
| INVENTOR(S) | : Te-Chuan Liu et al. | |

It is certified that error appears in the above-identified patent and that said Letters Patent is hereby corrected as shown below:

On the title page, item (63), correct the filing date of 13/461,790 from "May 2, 2002" to --May 2, 2012--.

Signed and Sealed this
Twenty-third Day of February, 2016

Michelle K. Lee
*Director of the United States Patent and Trademark Office*